(12) United States Patent
Suzuki et al.

(10) Patent No.: US 7,765,461 B2
(45) Date of Patent: Jul. 27, 2010

(54) MOVING PICTURE PROCESSING DEVICE, INFORMATION PROCESSING DEVICE, AND PROGRAM THEREOF

(75) Inventors: Akihiko Suzuki, Huntington, NY (US); Kazuaki Hiraga, Tokyo (JP)

(73) Assignee: Panasonic Corporation, Osaka (JP)

( * ) Notice: Subject to any disclaimer, the term of this patent is extended or adjusted under 35 U.S.C. 154(b) by 1193 days.

(21) Appl. No.: 10/551,656

(22) PCT Filed: Apr. 5, 2004

(86) PCT No.: PCT/JP2004/004890

§ 371 (c)(1),
(2), (4) Date: Sep. 30, 2005

(87) PCT Pub. No.: WO2004/091201

PCT Pub. Date: Oct. 21, 2004

(65) Prior Publication Data

US 2006/0181631 A1    Aug. 17, 2006

(30) Foreign Application Priority Data

Apr. 3, 2003  (JP) .............................. 2003-100015
Feb. 12, 2004 (JP) .............................. 2004-034691

(51) Int. Cl.
 *G06F 17/00* (2006.01)
(52) U.S. Cl. .......................... 715/200; 348/33; 725/36; 725/37; 345/638
(58) Field of Classification Search ................ 348/333, 348/333.02; 725/36–37; 345/638; 715/200
See application file for complete search history.

(56) References Cited

U.S. PATENT DOCUMENTS

| 5,768,697 | A   | * | 6/1998  | Shirakawa ............... 455/181.1 |
| 5,930,501 | A   | * | 7/1999  | Neil .......................... 713/400 |
| 6,437,797 | B1  |   | 8/2002  | Ota |
| 6,457,057 | B1  | * | 9/2002  | Kageyu et al. ............. 709/231 |
| 6,661,966 | B1  | * | 12/2003 | Furuyama et al. ........... 386/65 |
| 6,822,661 | B2  | * | 11/2004 | Sai et al. .................... 715/716 |
| 6,961,061 | B1  | * | 11/2005 | Johnson et al. ............ 345/473 |
| 7,100,105 | B1  | * | 8/2006  | Nishimura et al. ......... 715/209 |
| 2002/0120395 | A1 |  | 8/2002  | Smith |

(Continued)

FOREIGN PATENT DOCUMENTS

CN  1378156 A  11/2002

(Continued)

OTHER PUBLICATIONS

International Search Report corresponding to International Application No. PCT/JP2004/004890 dated Apr. 5, 2004.

*Primary Examiner*—Doug Hutton
*Assistant Examiner*—Benjamin J Smith
(74) *Attorney, Agent, or Firm*—RatnerPrestia

(57) ABSTRACT

To present a moving picture processing device having a user interface very easy to use when selecting part of moving pictures from multiple moving pictures. The moving picture processing device comprises a moving picture display unit for displaying whole or part of plural stored moving pictures sequentially, an input accepting unit for accepting an input for display of moving picture, a moving picture menu compiling unit for compiling a menu of moving pictures displayed when the input accepting unit accepts the input, and a menu display unit for displaying a menu of moving pictures compiled by the moving picture menu compiling unit.

5 Claims, 24 Drawing Sheets

| ID | Nation identifier | Local time against Japan time |
|----|-------------------|-------------------------------|
| 1  | America           | -17                           |
| 2  | China             | -1                            |
| :  | :                 | :                             |

U.S. PATENT DOCUMENTS

| | | | |
|---|---|---|---|
| 2002/0184047 A1* | 12/2002 | Plotnick et al. | 705/1 |
| 2002/0199189 A1* | 12/2002 | Prijatel et al. | 725/36 |
| 2003/0018972 A1* | 1/2003 | Arora | 725/47 |
| 2003/0069893 A1 | 4/2003 | Kanai et al. | |
| 2003/0095789 A1* | 5/2003 | Wakimoto et al. | 386/52 |
| 2004/0073920 A1* | 4/2004 | Yuen et al. | 725/41 |

FOREIGN PATENT DOCUMENTS

| | | |
|---|---|---|
| EP | 04 72 5793 | 11/2008 |
| JP | 8-251527 | 9/1996 |
| JP | 09-037180 | 2/1997 |
| JP | 9-322109 | 12/1997 |
| JP | 10-66058 A | 3/1998 |
| JP | 11-27609 | 1/1999 |
| JP | 2001-50756 | 2/2001 |
| JP | 2001-119653 | 4/2001 |
| JP | 2001-282813 | 10/2001 |
| JP | 2004-45651 | 2/2004 |
| WO | WO 96/24113 A | 8/1996 |
| WO | WO 01/77906 A2 | 10/2001 |

* cited by examiner

| ID | Moving picture identification information |
|----|-------------------------------------------|
| 1  | Second moving picture                     |
| 2  |                                           |
| 3  |                                           |
| 4  |                                           |
| 5  |                                           |

FIG. 6
| ID | Moving picture identification information |
|---|---|
| 1 | Second moving picture |
| 2 | Fifth moving picture |
| 3 | Eighth moving picture |
| 4 | Tenth moving picture |
| 5 | Eleventh moving picture |
FIG. 7
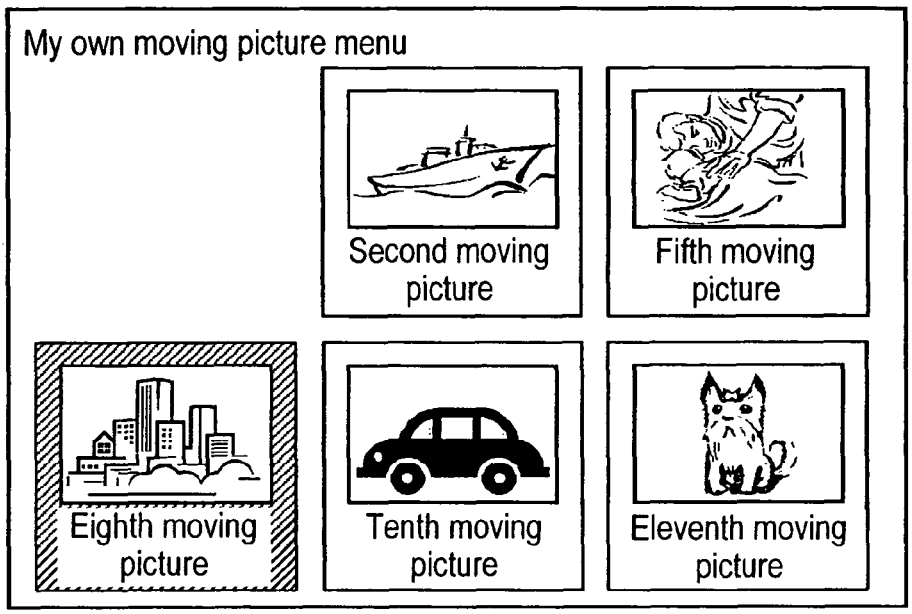
FIG. 8
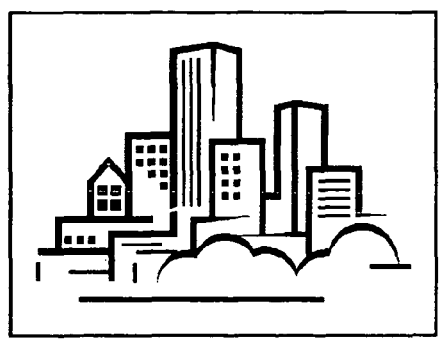

FIG. 11
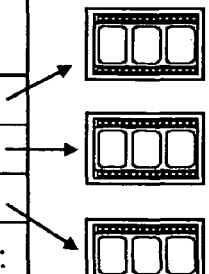
FIG. 12
| Serious |
|---|
| Hard-boiled |
| Fairy tale |
| Home drama |
FIG. 13
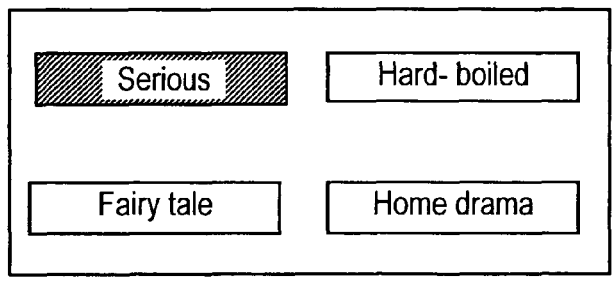
FIG. 14
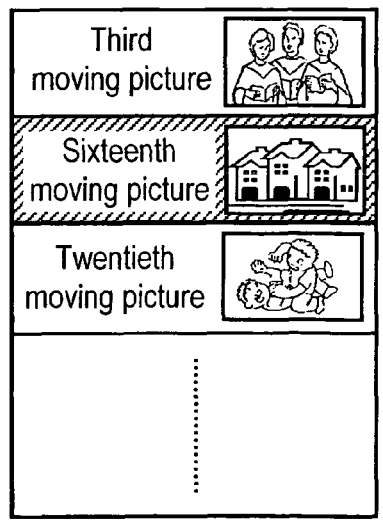

| ID | Program identifier | Output time | Channel |
|---|---|---|---|
| 1 | Program AA | 17:00 to18:00 | 2 |
| 2 | Program BB | 18:00 to 18:15 | 2 |
| 3 | Program CC | 17:00 to 17:30 | 4 |
| : | : | : | : |

FIG. 19

| ID | Program identifier | Moving picture |
|---|---|---|
| 1 | Program AA | 🎞 |
| 2 | Program CC | 🎞 |
| : | : | : |

FIG. 20

|   | 16:00 | | 17:00 | | 18:00 |
|---|---|---|---|---|---|
| 2 | | | | | |
| 4 | | | | | |
| : | : | : | : | : | : |

FIG. 21

|   | 16:00 | | 17:00 | | 18:00 |
|---|---|---|---|---|---|
| 2 | | | | 🏞🚗 | |
| 4 | | | | | |
| : | : | : | : | : | : |

FIG. 22

|   | 16:00 | | 17:00 | | 18:00 |
|---|---|---|---|---|---|
| 2 | | | | 🏞🚗 | 🏢 |
| 4 | | | | | |
| : | : | : | : | : | : |

FIG. 27
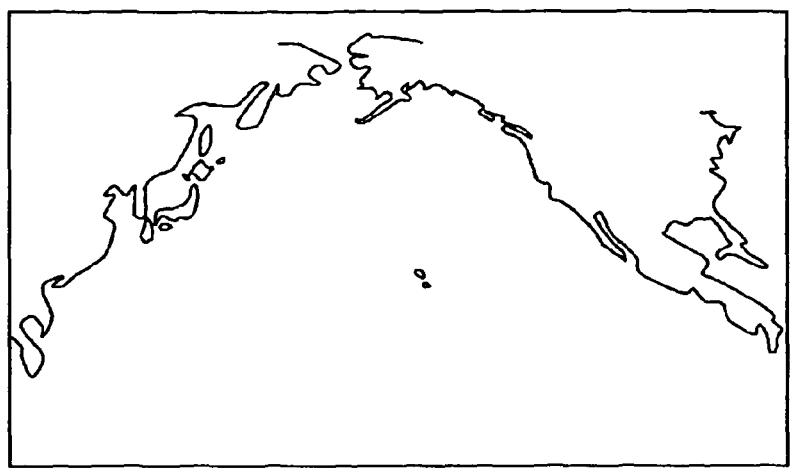
FIG. 28
| ID | Nation identifier | Local time against Japan time |
|---|---|---|
| 1 | America | -17 |
| 2 | China | -1 |
| : | : | : |
FIG. 29
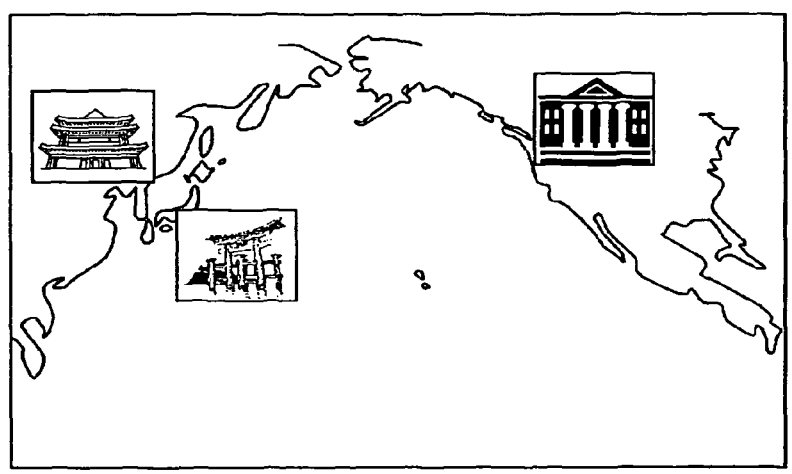

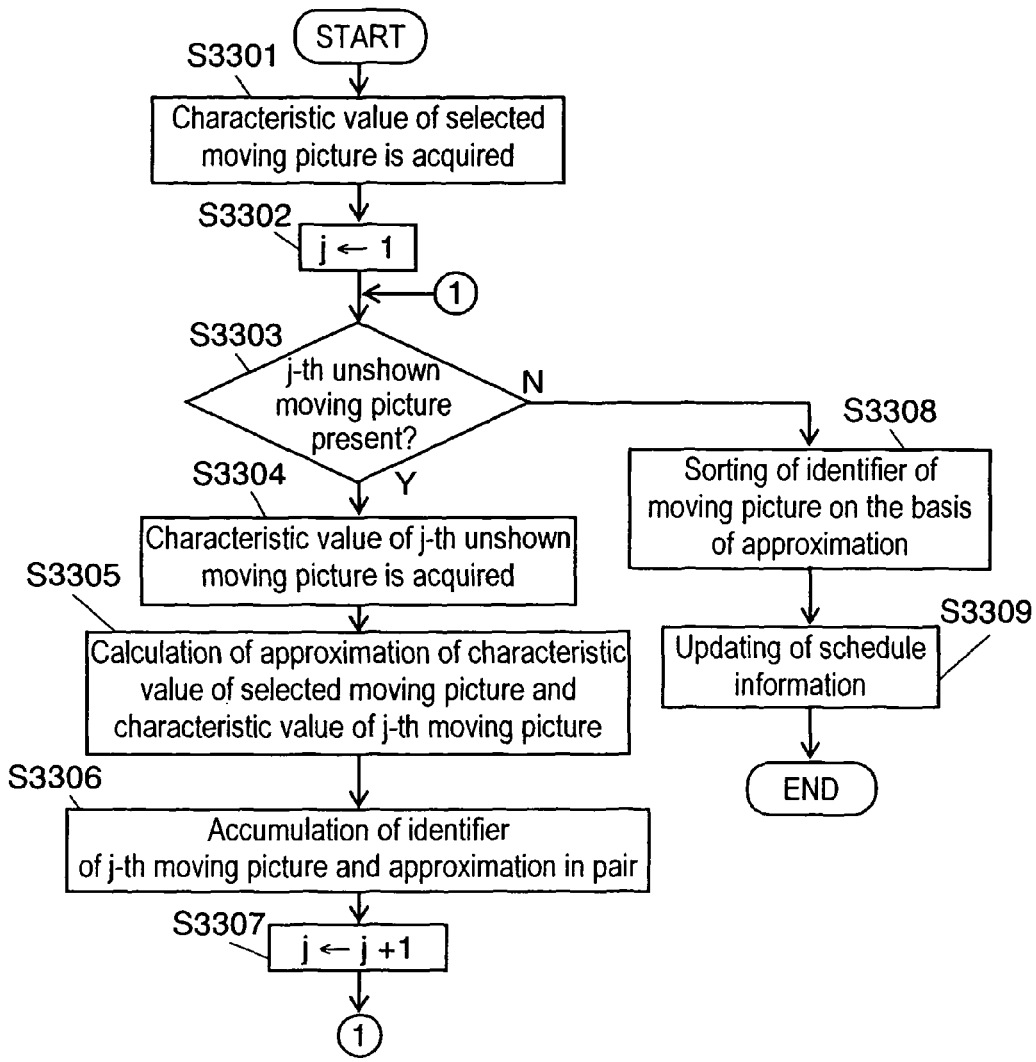

| ID | Moving picture identification information |
|---|---|
| 1 | Moving picture X |
| 2 | Moving picture Y |
| : | : |
| N | Moving picture N |

| Moving picture identification information | Approximation |
|---|---|
| Moving picture Z | 19 |
| : | : |
| Moving picture N | 4 |

| ID | Moving picture identification information |
|---|---|
| 1 | Moving picture A |
| 2 | Moving picture N |
| : | : |
| N-3 | Moving picture Z |
| N-2 | Moving picture B |

| ID | Program identifier | Output time | Channel |
|---|---|---|---|
| 31 | Program 15 | 10:00 to 11:00 | 8 |
| 38 | Program 16 | 11:00 to 11:15 | 8 |
| 40 | Program 17 | 11:15 to 12:00 | 8 |
| 48 | Program 18 | 12:00 to 13:00 | 8 |
| 52 | Program 25 | 10:00 to 10:30 | 10 |
| 55 | Program 26 | 10:30 to 11:30 | 10 |
| : | : | : | : |

| ID | Time zone information | Display method |
|---|---|---|
| 1 | up to 10 minutes | Object, still picture display |
| 2 | 11 to 15 minutes | Still picture display |
| 3 | 16 to 30 minutes | Frame feed reproduction |
| 4 | 31 to 60 minutes | Speed 1, moving picture reproduction |
| 5 | 61 to 120 minutes | Object, moving picture reproduction |
| 6 | 121 minutes and over | Moving picture standard reproduction | nt1
MOVING PICTURE PROCESSING DEVICE, INFORMATION PROCESSING DEVICE, AND PROGRAM THEREOF

This Application is a U.S. National Phase Application of PCT International Application PCT/JP2004/004890, Dated Apr. 5, 2004.

TECHNICAL FIELD

The present invention relates to a moving picture display device or the like having features in interaction on displayed moving picture or display method of moving picture or the like.

BACKGROUND ART

A first prior art is a technology of customizing menu items of user's application.

A second prior art is a device of displaying a favorable and easy-to-read electronic program guide by displaying a still picture composed of reduced screens on the electronic program guide. Such device is disclosed in Japanese Patent Application Laid-Open No. 09-037180.

A third prior art is a technology of displaying plural moving pictures on one screen.

DISCLOSURE OF THE INVENTION

A moving picture display device comprises:
a moving picture storage unit for storing one or more moving pictures having position information as attribute values; and
a moving picture display unit for displaying the one or more moving pictures,
in which the moving picture display unit displays the position information corresponding to the moving picture visually when displaying the moving picture.

A moving picture display device determines the output position of moving picture on the basis of position information related to moving picture, and displays one or more moving pictures on the basis of the determination.

A program causes a computer to execute, comprises:
a step of determining the display position of moving picture on the basis of position information pairing with one or more moving pictures; and
a step of displaying one or more moving pictures at the position shown by the display position.

BRIEF DESCRIPTION OF THE DRAWINGS

FIG. 6 is a diagram of structure of moving picture identification information in preferred embodiment 1.

FIG. 7 is a diagram showing an example of display mode of moving picture menu in preferred embodiment 1.

FIG. 8 is a diagram showing a display example of selected moving picture in preferred embodiment 1.

FIG. 11 is a diagram showing moving picture control table in preferred embodiment 2.

FIG. 12 is a diagram showing characteristic menu item control table in preferred embodiment 2.

FIG. 13 is a diagram of display example of characteristic menu in preferred embodiment 2.

FIG. 14 is a diagram of display example of moving picture list in preferred embodiment 2.

FIG. 19 is a diagram of moving picture control table in preferred embodiment 3.

FIG. 20 is a diagram of display example of frame of program guide in preferred embodiment 3.

FIG. 21 is a diagram of output example of electronic program guide in preferred embodiment 3.

FIG. 22 is a diagram of output example of electronic program guide in preferred embodiment 3.

FIG. 27 is a diagram of example of map information in preferred embodiment 4.

FIG. 28 is a diagram of world clock information control table in preferred embodiment 4.

FIG. 29 is a diagram of display example of moving picture in preferred embodiment 4.

FIG. 33 is a flowchart of operation of change process of schedule information in preferred embodiment 5.

FIG. 34 is a diagram of moving picture control table in preferred embodiment 5.

DETAILED DESCRIPTION OF THE PREFERRED EMBODIMENTS

Figure 1:
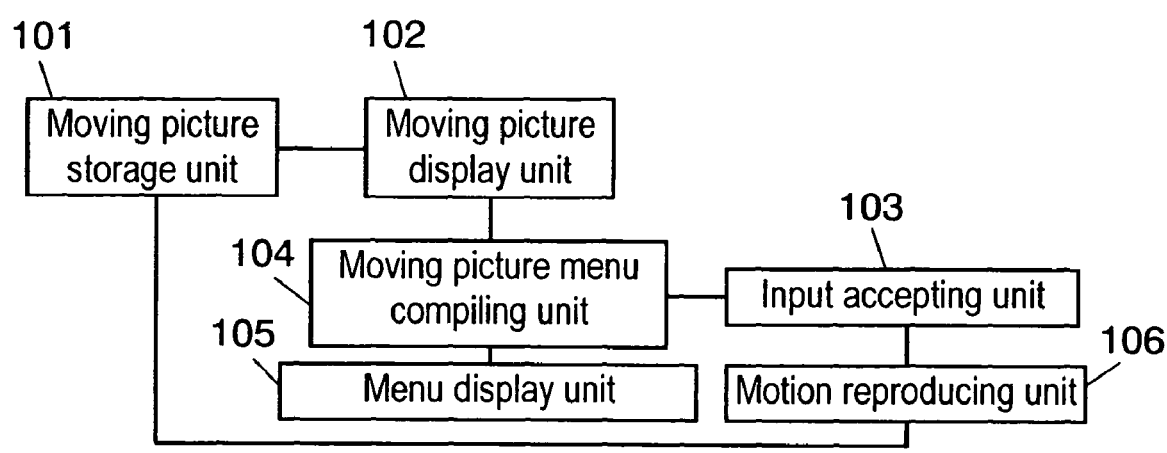
FIG. 1 is a block diagram of configuration of moving picture processing device in preferred embodiment 1.

In the first prior art, only the operation menu can be customized by the user, and the user interface is not easy to use, for example, for selecting a specific number of moving pictures from multiple moving pictures. In principle, in the first prior art, function selection or application selection is assumed, but it is not a technology assuming moving picture selection. The second prior art is intended to display still pictures, not moving pictures. It is not intended to cut the image by the size corresponding to the time frame of program. The second prior art is not designed to display moving pictures in a program guide, give images of output contents adequately to the user, and transmit the time and duration of contents output immediately. The third prior art is intended to display plural moving pictures on one screen, not visually expressing the position information of moving pictures. For example, when a moving picture is seen as sightseeing information, the information of the location shown by the moving picture must be separately obtained by the user.

To solve these problems, the invention presents a moving picture processing device comprising a moving picture storage unit storing a plurality of moving pictures, a moving picture display unit for displaying whole or part of the plurality of moving pictures sequentially, an input accepting unit for accepting an input about display of moving picture, a moving picture menu compiling unit for compiling a menu of moving pictures displayed at the time of acceptance of input by the input accepting unit, and a menu display unit for displaying the menu of moving pictures compiled by the moving picture menu compiling unit. Such moving picture processing device presents a user interface that is very easy to use when selecting some of the moving pictures from multiple moving pictures. Further, from one or more selected moving pictures, a moving picture selection menu can be composed according to the preference of the user. The invention also presents a moving picture processing device comprising a moving picture storing unit storing one or more moving pictures, a moving picture menu compiling unit for compiling a menu having images for identifying one or more moving pictures by one or more moving pictures, a menu display unit for displaying the menu compiled by the moving picture menu compiling unit, a characteristic menu display unit for displaying a characteristic menu having one or more items expressing the characteristics of moving pictures, an input accepting unit for accepting a selection instruction of image displayed by the menu display unit, and a selection instruction of item possessed by the characteristic menu, a moving picture selecting unit for selecting a moving picture having the characteristic indicated by the corresponding item from the moving picture storing unit, for a moving picture identified by the image when the input accepting unit accepts the selection instruction of image and accepts the selection instruction of item possessed by the characteristic menu, and a menu changing unit for changing the image of menu display unit by replacing the moving picture corresponding to the selected and instructed image accepted in the input accepting unit with the moving picture selected by the moving picture selecting unit. By this moving picture processing device, the moving picture menu can be updated by a simple operation, and the moving pictures can be exchanged by an excellent user interface by the characteristics of moving pictures.

The invention further presents an information processing device for displaying an electronic program guide, comprising a program information storage unit storing one or more pieces of program information as information about programs for composing the electronic program guide, a moving picture storing unit storing one or more moving pictures for identifying the program information, and a program guide display unit for displaying the electronic program guide including moving pictures, by using one or more pieces of program information in the program information storage unit, and one or more moving pictures in the moving picture storage unit, in which the program guide display unit displays the moving picture for identifying the program by changing the size of the moving picture depending on the output time of the program. By this information processing device, by viewing the program guide, the user instantly knows the time zone and duration of contents.

The invention also presents a moving picture display device comprising a moving picture storage unit storing one or more moving pictures having position information as information showing the position as attribute values, and a moving picture display unit for displaying one or more moving pictures, in which the moving picture display unit displays the moving picture in a mode of visually expressing the position information corresponding to the moving picture. Such moving picture display device is preferably applied as information display device of sightseeing guide, in particular.

The moving picture display unit in the moving picture processing device of the invention further includes schedule information holding means for holding schedule information as information about schedule of displaying plural moving pictures, moving picture display means for displaying whole or part of the plural moving pictures sequentially on the basis of the schedule information, and a schedule information changing unit for changing the schedule information on the basis of acceptance of the input when the input accepting unit accepts the input for display of moving pictures, in which the moving picture display means displays whole or part of the plural moving pictures sequentially on the basis of the schedule information changed by the schedule information changing unit. In this moving picture processing device, a moving picture preferred by the user can be found out earlier. Moreover, a menu can be compiled quickly when composing a moving picture menu.

The invention further presents an information processing device for displaying an electronic program guide having one or more pieces of program information including program identifier as information for identifying a program, and time zone information as information showing the on-air time zone of the program, in which the size of display frame of program information is changed on the basis of one or more pieces of time zone information possessed in one or more pieces of displayed program information, or time zone information possessed in the focused program information. By this information processing device, a very easy-to-read electronic program guide is obtained.

The invention further presents an information processing device for displaying an electronic program guide having one or more pieces of program information including a program identifier, time zone information, and moving pictures, in which the display method of moving pictures is changed on the basis of the time zone information, and the moving picture possessed in the program information is displayed. By this information processing device, the moving picture can be displayed in a proper size suited to the display frame of the program, so that an electronic program guide very easy to read and very easy to understand the contents of programs can be obtained. According to the invention, the moving pictures can be displayed and utilized effectively. By the information processing device for displaying the electronic program guide of the invention, an appropriate electronic program guide can be presented.

Preferred embodiments of the invention are specifically described below while referring to the accompanying drawings. Throughout the preferred embodiments, constituent elements and flowchart steps identified with same reference numerals have the same functions, and repeated explanation may be omitted if once explained.

Preferred Embodiment 1

FIG. 1 is a block diagram of configuration of moving picture processing device in preferred embodiment 1. The moving picture processing device comprises a moving picture storage unit 101, a moving picture display unit 102, an input accepting unit 103, a moving picture menu compiling unit 104, a menu display unit 105, and a motion reproducing unit 106.

The moving picture storage unit 101 stores a plurality of moving pictures. Data structure of moving picture is not specified. The moving picture storage unit 101 is preferably a nonvolatile recording medium, but it may be also realized by volatile recording medium.

The moving picture display unit 102 displays whole or part of plural moving pictures sequentially. The moving picture display unit 102 is realized usually by MPU or other memory. The processing procedure of the moving picture display unit 102 for displaying moving pictures is realized by software and/or hardware (exclusive circuit). The moving picture display unit 102 may either include a display or control output to an external display.

The input accepting unit 103 accepts a motion beginning instruction (starting instruction), a motion end instruction, an input of selection of moving picture displayed in the moving picture display unit 102 (moving picture selection input), and a selection of menu item (menu selection input) out of moving picture menu compiled by the moving picture menu compiling unit 104. Input means of moving picture selection input is not specified, including keyboard, mouse, remote control, or menu screen. The input accepting unit 103 is realized by device driver of input means such as remote controller, or control software of menu screen or the like.

The moving picture menu compiling unit 104 compiles a menu of moving pictures on the basis of the displayed moving picture when the input accepting unit 103 accepts moving picture selection input. The menu compiling method of the moving picture menu compiling unit 104 is not specified. The moving picture menu compiling unit 104, for example, cuts off a window, and displays plural moving pictures in this window. The plural moving pictures are the plural moving pictures being displayed when the input accepting unit 103 accepts the moving picture selection input. The moving picture menu compiling unit 104 is usually realized by MPU or other memory. The processing procedure of the moving picture menu compiling unit 104 for compiling the memory is usually realized by software, and the software is recorded in ROM or other recording medium. It may be also realized by hardware (exclusive circuit).

The menu display unit 105 displays the menu of moving pictures compiled by the moving picture menu compiling unit 104. The menu display unit 105 is usually realized by MPU or other memory. The processing procedure of the menu display unit 105 for displaying the menu of moving pictures is realized by software and/or hardware (exclusive circuit). The menu display unit 105 may either include a display or control output to an external display.

The motion reproducing unit 106, when the input accepting unit 103 accepts menu selection input, reads out the selected motion from the moving picture storage unit 101, and reproduces. In this case, the motion reproducing unit 106 usually displays the moving picture on the whole screen surface. The motion reproducing unit 106 is usually realized by MPU or other memory. The processing procedure of the motion reproducing unit 106 for displaying the moving picture is realized by software and/or hardware (exclusive circuit). The motion reproducing unit 106 may either include a display or control output to an external display.

Figure 2:
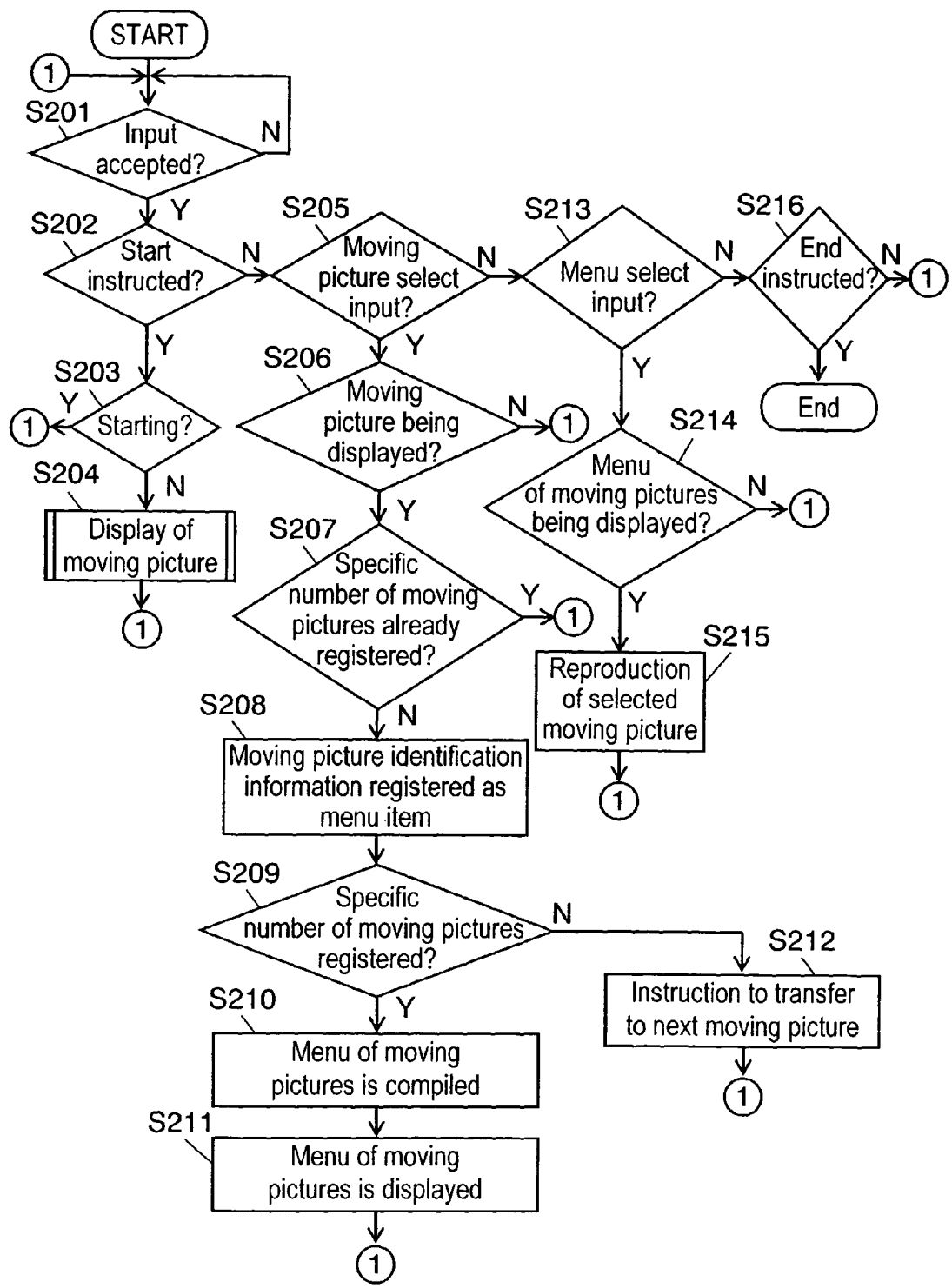
FIG. 2 is a flowchart of operation of moving picture processing device in preferred embodiment 1.

The operation of the moving picture processing device is explained below by referring to the flowchart in FIG. 2.

(Step S201) The input accepting unit 103 judges if an input is accepted or not. The process goes to step S202 when accepting an input, and returns to step S201 when not accepting.

(Step S202) It is judged if the input accepted at step S201 is an input of starting instruction or not. The process goes to step S203 in the case of input of starting instruction, or jumps to step S213 otherwise.

(Step S203) The moving picture display unit 102 judges if the moving picture processing device is presently starting or not. The process returns to step S201 if starting, or goes to step S204 if not starting.

(Step S204) The moving picture display unit 102 displays whole or part of the moving pictures in the moving picture storage unit 101 sequentially. Such motion of display of moving picture is executed parallel to motion at other step. For example, during display of moving picture, input from the user can be accepted.

(Step S205) It is judged if the input accepted at step S201 is a moving picture selection input or not. The process goes to step S206 in the case of moving picture selection input, or goes to step S213 otherwise.

(Step S206) The moving picture menu compiling unit 104 judges if the moving picture is presently displayed or not (whether the moving picture is being displayed or not at step S204). The process goes to step S207 if the moving picture is being displayed, or returns to step S201 if not displayed.

(Step S207) The moving picture menu compiling unit 104 judges if a specific number of moving pictures have been already registered or not. The process returns to step S201 if a specific number of moving pictures have been already registered, and goes to step S208 otherwise. Herein, the moving pictures are moving pictures for composing the menu of moving pictures.

(Step S208) The moving picture menu compiling unit 104 registers the displayed moving pictures when the input accepting unit 103 accepts the moving picture selection input.

To register a moving picture is, for example, to record the information for identifying the moving picture in a predetermined memory. To register a moving picture means also that one moving picture can be distinguished from other moving picture by other method.

(Step S209) The moving picture menu compiling unit 104 judges if a specific number of moving pictures have been already registered or not. The process goes to step S210 if a specific number of moving pictures have been already registered, and jump to step S212 otherwise.

(Step S210) The moving picture menu compiling unit 104 compiles a menu for selecting moving pictures (moving picture menu) on the basis of the registered moving pictures.

(Step S211) The menu display unit 105 displays the menu of moving pictures compiled at step S210. Then the process returns to step S201.

(Step S212) The moving picture menu compiling unit 104 instructs the moving picture display unit 102 so that the moving picture display in the moving picture display unit 102 may step to next moving picture. Then the process returns to step S201. The moving picture menu compiling unit 104 may also wait until completion of reproduction of the present motion.

(Step S213) It is judged if the input accepted at step S201 is selection of one moving picture in the moving picture menu or not. The process goes to step S214 in the case of selection of one moving picture, and goes to step S216 otherwise.

(Step S214) The motion reproducing unit 106 judges if the moving picture menu is being displayed or not. The process goes to step S215 if the moving picture menu is displayed, and returns to step S201 otherwise.

(Step S215) The motion reproducing unit 106 reads out the moving picture selected at step S213 from the moving picture storage unit 101, and reproduces it. In such a case, the motion reproducing unit 106 displays the moving picture on the entire screen of the display.

(Step S216) It is judged if the input accepted at step S201 is an end instruction or not. The process is terminated in the case of end instruction, or returns to step S201 otherwise.

Figure 3:
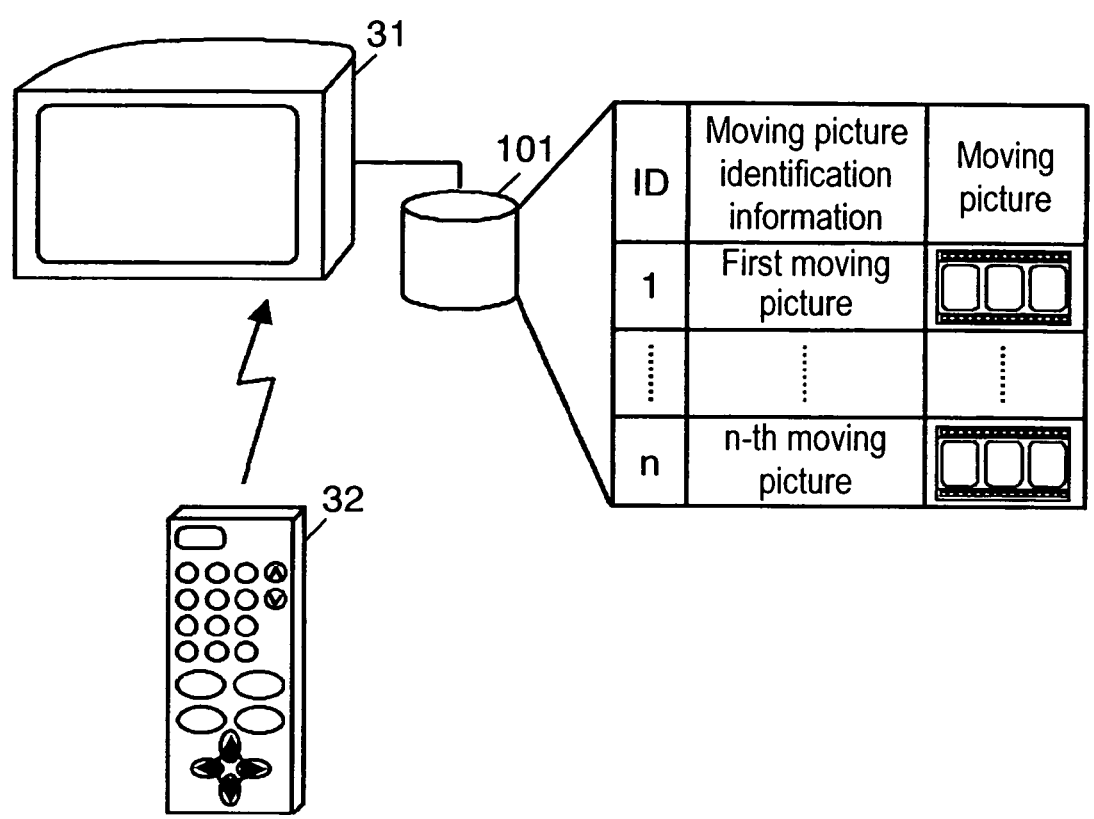
FIG. 3 is a concept diagram of moving picture processing system in preferred embodiment 1.

Specific operation of the moving picture processing system including the moving picture processing device in the preferred embodiment is explained below. A concept diagram of the moving picture processing system is shown in FIG. 3. The moving picture treating system comprises a moving picture processing device 31 and a remote controller 32. The moving picture processing device 31 has a recording medium of large capacity (for example, hard disk), and multiple moving pictures are stored in this recording medium. This recording medium is the moving picture storage unit 101 mentioned above. An example of information stored in the moving picture storage unit 101 is shown in FIG. 3. It includes plural sets of "ID," "moving picture identification information," and "moving picture (entity data)." "ID" is information identifying a record in table structure. "Moving picture identification information" is information identifying moving picture (entity data). Data structure of moving picture (entity data) is not particularly specified. Moving picture (entity data) may be composed of video data alone or may contain audio data.

The user operates the moving picture processing device by using the remote controller as input means, selects preferred moving pictures from multiple moving pictures, and compiles a menu of own moving pictures.

The user starts the moving picture processing device by using the remote controller. To start up, the power button of the remote controller is pressed.

When started, the moving picture processing device reads out moving pictures from the recording medium in predetermined sequence or at random, and displays in the display unit. Specifically, the moving picture processing device reads out the moving pictures sequentially from the recording medium, and displays, for example, one moving picture for 4 seconds, and changes to a next moving picture. Such transition of moving pictures is shown in FIG. 4.

Figures 4, 5:
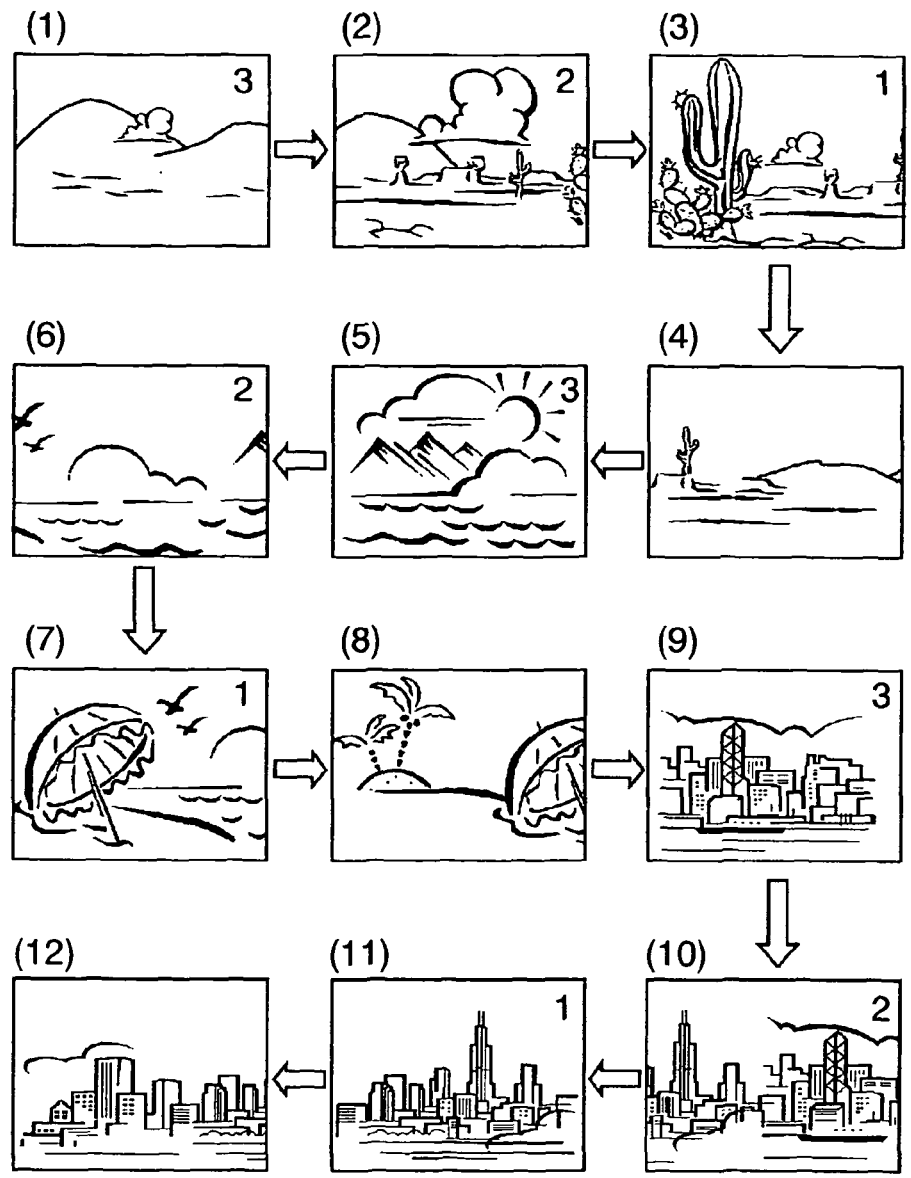
FIG. 4 is a diagram showing screen transition in preferred embodiment 1.
FIG. 5 is a diagram of structure of moving picture identification information in preferred embodiment 1.

In FIG. 4, the moving picture processing device reads out a first moving picture (moving picture of scenery such as mountain), and reproduces for 4 seconds. For example, the moving picture processing device reproduces the first 4 seconds of the image of one selected moving picture. In this case, the moving picture processing device also displays the time information showing the input accepting time of the displayed moving picture. That is, the sequentially displayed moving pictures are intended to urge the user to select for compiling a menu of moving pictures. Time information display begins at 3 (meaning 3 seconds to last), and changes to 2 and 1, and nothing is shown at last. Or time information of 0 may be displayed. The series of operation is shown in screen (1) to screen (4) in FIG. 4. During display of first moving picture, the moving picture processing device is waiting for selection and input of first moving picture.

Next, the moving picture processing device selects a second moving picture (moving picture of scenery of sea, etc.). Similarly, the moving picture processing device reproduces the second moving picture for 4 seconds. In this case, as shown in screen (5) to screen (8) in FIG. 4, the time information is also displayed, for example, in the upper right corner of the screen. During display of second moving picture, the moving picture processing device is waiting for selection and input of second moving picture.

Suppose Select button of the remote controller is pressed during display of second moving picture. In this case, the user has selected the second moving picture as a moving picture for compiling the menu. The moving picture processing device stores the moving picture identification information for identifying the second moving picture temporarily in memory. FIG. 5 shows the moving picture identification information stored in memory. The memory in FIG. 5 is capable of storing up to five pieces of moving picture identification information for identifying the moving pictures for compiling the moving picture memory, and it has five records containing "ID" and "moving picture identification information." FIG. 5 shows "second moving picture" is stored as the moving picture identification information of "ID=1."

Next, the moving picture processing device jumps to a first field of a third moving picture. After selection of second moving picture, meanwhile, the display of second moving picture may continue until the time expires.

Similarly, the moving picture processing device displays third moving picture (see screen (9) to screen (12) in FIG. 4). Waiting for pressing of Select button of the remote controller, the moving picture processing device continues to display moving pictures successively. In this process, suppose Select button of the remote controller is pressed during display of fifth moving picture, eighth moving picture, tenth moving picture, and eleventh moving picture.

Responding to pressing of Select button of the remote controller, the moving picture processing device stores the moving picture identification information in the specified memory. FIG. 6 shows five pieces of moving picture identification information stored in the memory. When five pieces of moving picture identification information are stored in the memory, the moving picture processing device automatically compiles a menu of moving pictures by using the moving pictures identified by these five pieces of moving picture identification information. This menu of moving pictures is a menu used by the user for reproducing desired moving pictures by simple operation. The moving picture processing device the moving pictures identified by the five pieces of moving picture identification information. Mode of displaying five moving pictures is not particularly specified. Five moving pictures are displayed, for example, as shown in FIG. 7. That is, one moving picture is shown in one window. That is, five windows are created, and a corresponding moving picture is reproduced in each window.

In this state, the user selects one screen by using the remote controller. For example, when the eighth moving picture is focused in FIG. 7, the user has pressed Decide button of the remote controller.

Receiving a signal of pressing of Decide button of the remote controller, the moving picture processing device selects the focused eighth moving picture from the moving picture storage unit 101, and displays in the entire screen of the display unit. That is, the moving picture processing device erases the windows in FIG. 7, and reproduces the moving picture identified by the eighth moving picture in a window (see FIG. 8).

According to this preferred embodiment, one moving picture can be selected from plural moving pictures by simple user interface. From one or more selected moving pictures, a menu of selected moving pictures preferred by the user can be compiled automatically. The moving picture processing device is very effective in particular when multiple moving pictures are stored in a recording medium of large capacity.

According to the preferred embodiment, after a specific number of moving pictures are selected from multiple stored moving pictures, a menu of moving pictures is automatically displayed. Instead, the user may be allowed to select moving pictures as many as desired, and a menu of moving pictures may be displayed according to the instruction from the user.

In the preferred embodiment, the moving picture display unit displays the time information showing the remaining time for accepting the input on the displayed moving picture, but display of time information is not essential.

In the preferred embodiment, after start, each moving picture is displayed for 4 seconds, and next moving picture is displayed, but the display time of selected moving picture is not specified. The display time may be different depending of moving pictures.

In the preferred embodiment, after start, when displaying each moving picture, part of long moving picture is cut out for 4 seconds, for example, and displayed, but a moving picture or still picture when selecting a long moving picture may be separately held and used.

In the embodiment, in the menu of moving pictures, the moving pictures are displayed in corresponding windows, but only the still picture or text representing the moving picture (moving picture identification information or the like) may be displayed. These variations are also same in the following preferred embodiments.

Further, processing in the preferred embodiment may be realized by software. The software may be distributed by downloading. Or the software may be recorded and distributed in recording medium such as CD-ROM. The same is applied in other preferred embodiments in the specification. The software for realizing the moving picture processing device in the preferred embodiment is a program described below. That is, this program is a program for causing a computer to execute a moving picture display step of displaying whole or part of plural stored moving pictures sequentially, an input accepting step of accepting an input on displayed moving picture, a moving picture menu compiling step of compiling a menu by using the moving pictures displayed when accepting an input at the input accepting step, and a menu display step of displaying a menu of moving pictures compiled at the moving picture menu compiling step.

Preferred Embodiment 2

This preferred embodiment is about moving picture processing device and others capable of exchanging menu items for composing a menu of moving pictures by a simple operation.

Figure 9:
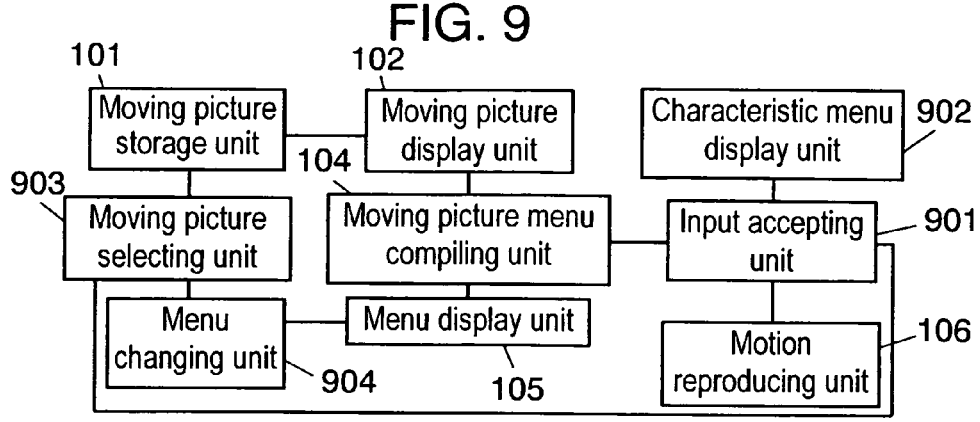
FIG. 9 is a block diagram of configuration of moving picture processing device in preferred embodiment 2.

FIG. 9 is a block diagram of configuration of moving picture processing device in preferred embodiment 2. The moving picture processing device comprises a moving picture storage unit 101, a moving picture display unit 102, an input accepting unit 901, a moving picture menu compiling unit 104, a menu display unit 105, a motion reproducing unit 106, a characteristic menu display unit 902, a moving picture selecting unit 903, and a menu changing unit 904.

The input accepting unit 901 accepts a motion beginning instruction (starting instruction), a motion end instruction, an input of selection of moving picture displayed in the moving picture display unit 102 (moving picture selection input), a selection of menu item (menu selection input) out of moving picture menu compiled by the moving picture menu compiling unit 104, a selection instruction of images displayed in the menu display unit 105 (exchange instruction), and a selection instruction of items in characteristic menu (characteristic selection instruction). Means for realizing the input accepting unit 901 is same as in the input accepting unit 103.

The characteristic menu display unit 902 displays a characteristic menu having one or more items showing the characteristic of the moving picture. Information of menu items for composing the characteristic menu is preliminarily stored, for example, in the characteristic menu display unit 902. Or information of menu items for composing the characteristic menu may be obtained from attribute information of moving picture. In such a case, the moving picture holds the characteristic value (serious rating 5, hard-boiled rating 3, etc.) for expressing the category of moving picture (serious, soft, hard-boiled, etc.). The characteristic menu display unit 902 is usually realized by MPU or other memory. The processing procedure of the characteristic menu display unit 902 for displaying the menu is realized by software and/or hardware (exclusive circuit). The characteristic menu display unit 902 may either include a display or control output to an external display. The characteristic menu display unit 902 stores the menu items for composing the characteristic menu in a nonvolatile recording medium or volatile recording medium.

The moving picture selecting unit 903 selects, when the input accepting unit 901 accepts a selection instruction of an image (exchange instruction) and also accepts a selection instruction of an item in the characteristic menu (characteristic selection instruction), the moving picture identified by the image, that is, the moving picture having the characteristic expressed by this item, from the moving picture storage unit 101. The moving picture selecting unit 903 is usually realized by MPU or other memory. The processing procedure of the moving picture selecting unit 903 for selecting a moving picture is usually realized by software, and the software is recorded in ROM or other recording medium. It may be also realized by hardware (exclusive circuit).

The menu changing unit 904 replaces the moving picture corresponding to the image of selection instruction (exchange instruction) accepted in the input accepting unit 901, with the moving picture selected by the moving picture selecting unit 903, and changes the image in the menu display unit 105. The menu changing unit 904 instructs exchange of an image to, for example, the menu display unit 105. In the menu display unit 105, a menu of moving pictures partly exchanged in image is displayed. The menu changing unit 904 is usually realized by MPU or other memory. The processing procedure of the menu changing unit 904 is usually realized by software, and the software is recorded in ROM or other recording medium. It may be also realized by hardware (exclusive circuit).

The operation of the moving picture processing device is explained below by referring to the flowchart in FIG. 10. The operation up to the step of displaying a menu of moving pictures is same as explained in preferred embodiment 1, and the explanation is omitted. In the flowchart in FIG. 10, in the situation of display of moving picture menu, the process of exchanging an item of moving picture menu is explained.

(Step S1001) The input accepting unit 901 judges if an input is accepted or not. The process goes to step S1002 when accepting an input, and returns to step S1001 when not accepting.

(Step S1002) The characteristic menu display unit 902 judges if the input accepted at step S1001 is an exchange instruction or not. The process goes to step S1003 in the case of exchange instruction, or jumps to step S1005 otherwise. The exchange instruction includes information showing the moving pictures to be exchanged.

(Step S1003) The characteristic menu display unit 902 reads out a characteristic menu including one or more items expressing the characteristic of moving picture.

(Step S1004) The characteristic menu display unit 902 displays the characteristic menu read out at step S1003. Then the process returns to step S1001.

(Step S1005) It is judged if the input accepted at step S1001 is a characteristic selection instruction or not. The process goes to step S1006 in the case of characteristic selection instruction, or jumps to step S1009 otherwise. The characteristic selection instruction includes information showing menu items for composing the characteristic menu.

(Step S1006) The moving picture selecting unit 903 judges if the characteristic menu is being displayed or not. The process goes to step S1007 when the characteristic menu is displayed, or returns to step S1001 if not displayed.

(Step S1007) The moving picture selecting unit 903 searches the moving picture to be exchanged, that is, the moving picture having the characteristic indicted by the selected menu item, from the moving picture storage unit 101. This search is to obtain a candidate of the moving picture to be exchanged.

(Step S1008) The moving picture selecting unit 903 displays one or more moving pictures obtained at step S1007, as candidates of the moving pictures to be exchanged. In this case, display mode includes list and others, and is not specified. Then the process goes to step S1001.

(Step S1009) It is judged if it is instructed to select candidates of moving pictures to be exchanged from one or more moving pictures displayed at step S1008. The process goes to step S1010 if selection of moving picture is instructed, and returns to step S1001 if not instructed.

(Step S1010) The moving picture selecting unit 903 judges if candidates of the moving pictures to be exchanged are being displayed or not. The process goes to step S1011 if candidates of the moving pictures to be exchanged are displayed, or returns to step S1001 if not displayed.

(Step S1011) The moving picture selecting unit 903 acquires the selected moving picture from the moving picture storage unit 101.

(Step S1012) The menu changing unit 904 replaces the moving picture to be exchanged with the moving picture acquired at step S1011, and instructs to change the image of the menu display unit 105.

(Step S1013) The menu display unit 105 draws again the menu of moving pictures. When drawing again, either the entire screen or only the changed region may be shown.

Figure 10:
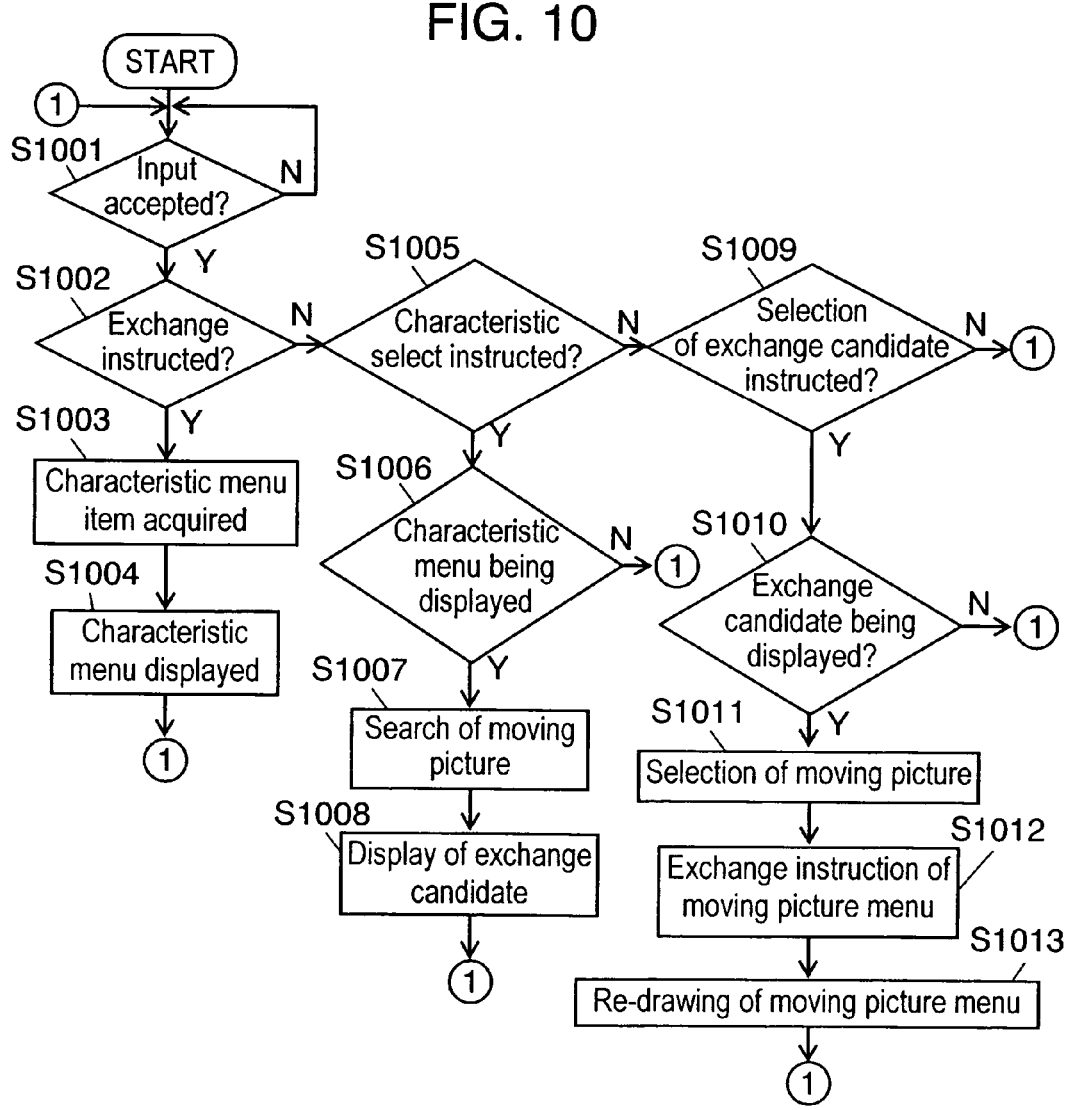
FIG. 10 is a flowchart of operation of moving picture processing device in preferred embodiment 2.

In the flowchart in FIG. 10, when plural moving pictures are acquired by selection of one menu item in the characteristic menu, plural candidates are displayed to be selected by the user, but the moving picture processing device may automatically select the moving picture of the largest characteristic value.

A specific operation of the moving picture processing system comprising the moving picture processing device of the preferred embodiment is explained. The concept of the moving picture processing system is same as shown in FIG. 3. However, the data structure of the moving picture storage unit has a structure of moving picture management table as shown in FIG. 11. In FIG. 11, the moving picture storage unit stores plural moving pictures, and each moving picture has plural characteristic values. For example, at ID=1, the moving picture identified by the moving picture identifier "first moving picture" means the serious rating 8, hard-boiled rating 7, fairy tale rating 1, and home drama rating 1. The moving picture management table in FIG. 11 has a pointer, and the moving pictures (entity data) are linked by the pointer.

FIG. 12 shows a characteristic menu item management table for managing characteristic menu items. FIG. 12 is a table for holding the information showing the characteristic of moving pictures. In FIG. 12, the characteristic menu display unit displays four characteristics.

In this case, the user, as explained in preferred embodiment 1, operates the moving picture processing device by the remote controller, and selects moving pictures to display, for example, a menu of moving pictures as shown in FIG. 7.

Next, the user enters an exchange instruction by the remote controller. The moving picture processing device accepts the exchange instruction, and displays a characteristic menu as shown in FIG. 13. In this case, the moving picture to be replaced is the "eighth moving picture" focused in FIG. 7.

Suppose the user selects "fairy tale" by moving the focus of characteristic menu in FIG. 13 by the remote controller (input of characteristic selection instruction).

The moving picture processing device selects a moving picture of high fairy tale rating from the eighth moving picture in FIG. 7, from the moving picture management table in FIG. 11. FIG. 14 is a list of moving pictures of the result. The list in FIG. 14 is a list displaying the moving picture identification information and one or more sets of moving pictures.

Figure 15:
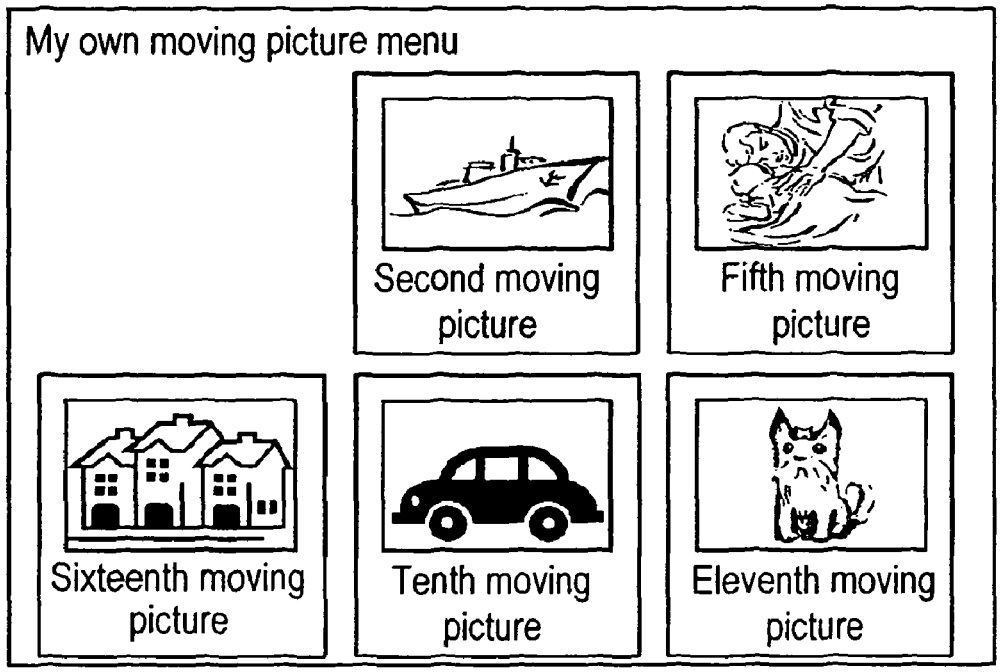
FIG. 15 is a diagram of display example of new moving picture menu in preferred embodiment 2.

Further, the user moves the focus up to the sixteenth moving picture, and selects the sixteenth moving picture. In this case, the moving picture processing device replaces the eighth moving picture in FIG. 7 with the sixteenth moving picture, and displays a new menu of moving pictures shown in FIG. 15. Thus, the user can update the moving picture menu according to the own preference.

According to the preferred embodiment, the moving picture menu can be updated by a simple user interface, and the moving pictures can be exchanged by an excellent user interface by characteristic of moving pictures.

In the preferred embodiment, items of characteristic menu are not limited to those shown in FIG. 12 alone. The moving picture processing device may acquire the items of characteristic menu from the attributes held in the moving pictures, and compile the characteristic menu dynamically. Display mode of characteristic menu is not specified.

Further, processing in the preferred embodiment may be realized by software. The software may be distributed by downloading. Or the software may be recorded and distributed in recording medium such as CD-ROM. The software for realizing the moving picture processing device in the preferred embodiment is a program described below. That is, this program is a program for causing a computer to execute a moving picture menu compiling step of compiling a menu having images for identifying one or more moving pictures, a menu display step of displaying a menu compiled at the moving picture menu compiling step, a characteristic menu display step of displaying a characteristic menu having one or more items showing characteristic of moving pictures, an input accepting step of accepting a selection instruction of images displayed at the menu display step, and a selection instruction of items contained in the characteristic menu, a moving picture selecting step of selecting, when accepting a selection instruction of an image, and also accepting a selection instruction of an item in the characteristic menu at the input accepting step, the moving picture identified by the image, that is, the moving picture having the characteristic expressed by this item, and a menu changing step of replacing the moving picture corresponding to the image of selection instruction accepted at the input accepting step, with the moving picture selected at the moving picture selecting step, and changing the image at the menu display step.

Preferred Embodiment 3

This preferred embodiment relates to an electronic program guide for displaying moving pictures (herein the moving pictures are moving pictures about the concerned contents) in a width corresponding to the output time of programs or contents.

Figure 16:
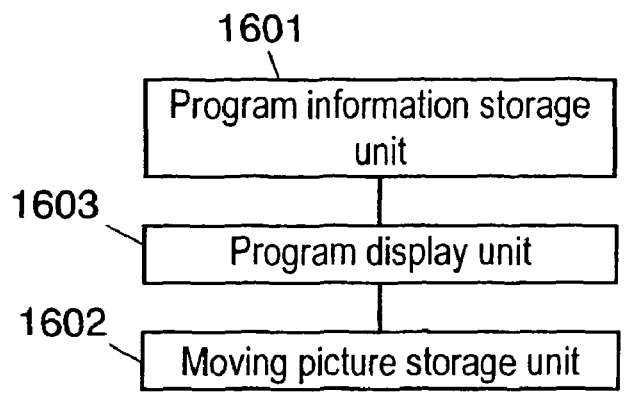
FIG. 16 is a block diagram of configuration of information processing device in preferred embodiment 3.

FIG. 16 is a block diagram of configuration of information processing device in preferred embodiment 3. The information processing device comprises a program information storage unit 1601, a moving picture storage unit 1602, and a program guide display unit 1603.

The program information storage unit 1601 stores one or more pieces of program information as information about programs for composing an electronic program guide. The program information includes, for example, a program identifier for identifying a program, information showing output time zone of program, and channel number. Data structure of program information is not particularly specified. Acquiring method of program information is not specified. Program information is obtained, for example, by receiving a broadcast. Program information may be also obtained through a network, or by reading out from a recording medium. The program information storage unit 1601 is preferably a nonvolatile recording medium, but may be also realized by a volatile recording medium.

The moving picture storage unit 1602 stores one or more moving pictures for identifying program information. Data structure of moving picture in the moving picture storage unit 1602 is not specified. The moving picture storage unit 1602 stores, for example, one or more pairs of program identifier and entity data of moving picture. Entity data of moving picture is data in structure of, for example, MPEG4 or MPEG7. Acquiring method of moving picture is not specified. Moving pictures may be obtained by receiving a broadcast, downloading through a network, or reading out from a recording medium. The moving picture storage unit 1602 is preferably a nonvolatile recording medium, but may be also realized by a volatile recording medium.

The program guide display unit 1603 displays an electronic program guide including moving pictures for identifying programs, by using one or more pieces of program information in the program information storage unit, and one or more moving pictures in the moving picture storage unit. When displaying the moving pictures for identifying the programs, the program guide display unit 1603 changes the size and displays the moving picture depending on the output time of the program. The program guide display unit 1603, specifically, displays the moving picture in a double region size when displaying program information of contents of 1-hour program, as compared with the case of displaying program information of contents of 30-minute program. The program guide display unit 1603 is usually realized by MPU or other memory. The processing procedure of the program guide display unit 1603 for displaying a program guide is realized by software, and the software is recorded in ROM or other recording medium. It may be also realized by hardware (exclusive circuit).

The operation of the information processing device is explained below by referring to the flowchart in FIG. 17.

(Step S1701) The program guide display unit 1603 acquires information for composing a frame of program guide stored preliminarily. Data structure of information for composing a frame of program guide is not specified.

(Step S1702) The program guide display unit 1603 displays a frame of program guide from the information for composing a frame of program guide acquired at step S1701.

(Step S1703) The program guide display unit 1603 puts "1" in counter i.

(Step S1704) The program guide display unit 1603 acquires i-th program information from the program information storage unit 1601.

(Step S1705) The program guide display unit 1603 judges if i-th program information is present or not. For example, the program guide display unit 1603 judges if the program information read at step S1704 is NULL or not. The process goes to step S1707 when i-th program information is present, or is terminated if not present.

(Step S1706) The program guide display unit 1603 reads the moving picture corresponding to the i-th program information from the moving picture storage unit 1602. For example, the moving picture in the moving picture storage unit 1602 is managed in pair with program identifier, and the program information has a program identifier. The program guide display unit 1603 reads out the moving picture forming pair with the program identifier possessed by the program information.

(Step S1707) The program guide display unit 1603 determines the position in the program guide for output of a moving picture from the information of output time zone of program of i-th program information. Specifically, when the program indicated by the program information is a program to be issued from 17:00 to 18:00, the position of moving picture output is determined so that the center of the moving picture may be located at the position of 17:30 in the program guide.

(Step S1708) The program guide display unit 1603, at the time of output of moving picture, masks a part of the moving picture by determining the masking region, from the information of output time zone of program in the i-th program information. If the output time of the program is has a region large enough for output of the entire moving picture, the program guide display unit 1603 does not mask.

(Step S1709) The program guide display unit 1603 issues the moving picture obtained at step S1706 to the position determined at step S1707.

(Step S1710) The program guide display unit 1603 increments counter i by 1. The process returns to step S1704.

In the flowchart, in the case of output of moving picture, usually, the output continues. When receiving an end command of program guide output, output of frame of program guide and moving picture is terminated.

A specific operation of the information processing device in the preferred embodiment is explained. Suppose the information processing device is holding a program information management table shown in FIG. 18. The program information management table has one or more records (program information) showing ID, program identifier, output time, and channel. The ID is the information for identifying a record, which is required in table management. The program identifier is information (program name) for identifying a program. The output time is the on-air time zone of a program. Herein, the output time is specified by program start time and end time, but it may be also specified by program start time and on-air duration. The channel is the channel number of broadcasting of a program. The information processing device also holds a moving picture management table shown in FIG. 19. The moving picture management table has one or more records showing the ID, program identifier, and moving picture. The moving picture is entity data of moving picture, for example, in data structure of MPEG4. The moving picture may be also broadcast from a promotion channel in an earlier than actual program, and accumulated in the information processing device.

In such a case, the information processing device first composes a frame of program guide, and displays. FIG. 20 shows a display example of frame of program guide. The program guide shows, for example, the channel number on the axis of ordinates, and the output time on the axis of abscissas. Or the program guide may show the channel number on the axis of abscissas, and the output time on the axis of ordinates.

Figures 17, 18:
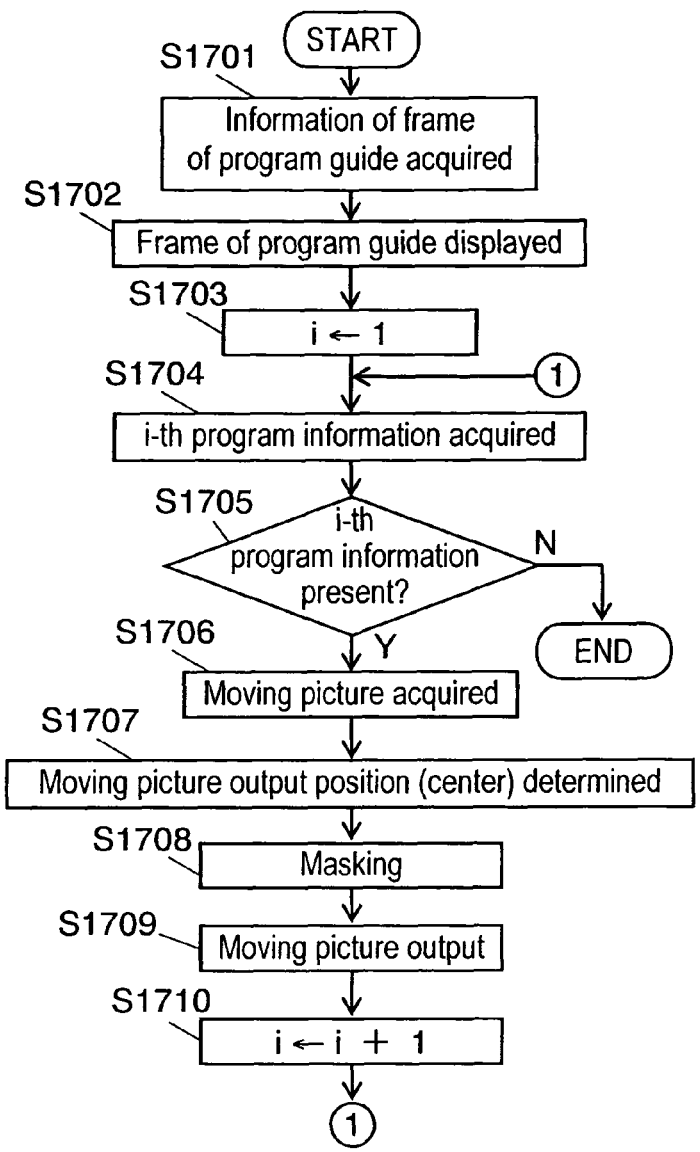
FIG. 17 is a flowchart of operation of information processing device in preferred embodiment 3.
FIG. 18 is a diagram of program information control table in preferred embodiment 3.

The information processing device acquires the first program information in FIG. 18. Next, the information processing device reads out the moving picture forming pair with program identifier "program AA" of first program information from the moving picture management table in FIG. 19. The information processing device determines the mask width (width of output moving picture) at the time of output of moving picture from the output time "1 hour" in first program information. As shown in FIG. 21, the moving picture identified by program AA is issued.

Next, the information processing device acquires second program information in FIG. 18, and similarly displays the moving picture forming pair with program identifier "program BB" within the frame of program guide (see FIG. 22). In this case, the width of moving picture of program BB is ¼ that of program AA. It is because the program output time is ¼.

Subsequently, the information processing device acquires third and all program information in FIG. 18, and displays the moving pictures in the frame of program guide (see FIG. 23). In this case, depending on the output time of the program, the information processing device changes the size of moving picture and displays when displaying the moving picture identified by the program. Together with display of moving picture, the program identifier may be also displayed in the program guide.

According to the preferred embodiment, the moving picture identifying the output contents can be issued within the program guide in a size of region depending on the output time zone. Therefore, the user knows at glance by viewing the program guide what contents are issued in which time zone and how long in duration.

In the preferred embodiment, the program guide is an output schedule of contents in a wide sense of meaning, and is not limited to the information of on-air schedule of broadcast programs. The program table may be also information showing output schedule of contents shown at, for example, museum or event hall. In such a case, channel information may not be included in the program guide. The same applies in other preferred embodiments.

In the preferred embodiment, the program is not limited to a broadcast program, but includes contents read out from recording medium, or contents downloaded from the network. That is, the program is synonymous with contents in a wider sense of meaning. The same applies in other preferred embodiments.

In the preferred embodiment, the moving picture is issued in a width of region depending on the output time by masking the moving picture, but the moving picture may be cut in a region depending on the output time. When displaying the moving picture for identifying the program, depending on the output time of the program, the moving picture may be displayed by changing the size, and the algorithm is not specified in such a case.

Further, processing in the preferred embodiment may be realized by software. The software may be distributed by downloading. Or the software may be recorded and distributed in recording medium such as CD-ROM. The software for realizing the information processing device in the preferred embodiment is a program described below. That is, this program is a program for causing a computer to execute a step of displaying a frame of program guide, a step of determining display position and display region of moving picture for identifying the program information on the basis of program information, and a step of displaying a moving picture for identifying the program information in the program guide on the basis of the determination. Meanwhile, the step of displaying a frame of program guide, and the step of displaying the moving picture in the program guide may be may be processed parallel or may not be specified in sequence.

Preferred Embodiment 4

This preferred embodiment relates to a moving picture display device for displaying a moving picture having position information or related to position information, by disposing on the basis of the position information.

Figures 23, 24:
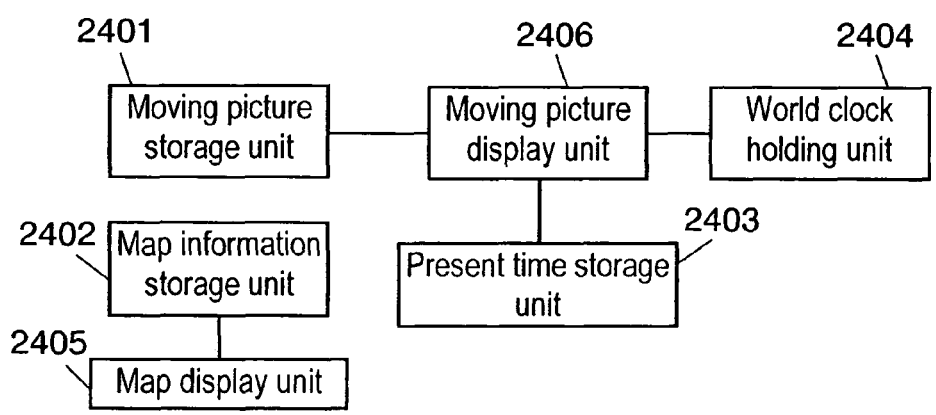
FIG. 23 is a diagram of output example of electronic program guide in preferred embodiment 3.
FIG. 24 is a block diagram of configuration of moving picture display device in preferred embodiment 4.

FIG. 24 is a block diagram of moving picture display device. The moving picture display device comprises a moving picture storage unit 2401, a map information storage unit 2402, a present time acquiring unit 2403, a world clock holding unit 2404, a map display unit 2405, and a moving picture display unit 2406.

The moving picture storage unit 2401 stores one or more moving pictures having position information showing the position as attribute value. Data structure of moving picture is not specified. Holding manner of attribute value of moving picture is not specified. The moving picture storage unit 2401 is preferably a nonvolatile recording medium, but may be also realized by a volatile recording medium.

The map information storage unit 2402 stores map information. Data structure of map information is not specified. The map information storage unit 2402 is preferably a nonvolatile recording medium, but may be also realized by a volatile recording medium.

The present time acquiring unit 2403 acquires the present time from a clock not shown. The present time acquiring unit 2403 is usually realized by MPU or other memory. The processing procedure of the present time acquiring unit 2403 for acquiring the present time is realized by software, and the software is recorded in ROM or other recording medium. It may be also realized by hardware (exclusive circuit).

The world clock holding unit 2404 is holding the world time. The world time holding unit 2404 holds one or more pairs of nation identifier and present time. The present time is incremented like the clock. The world time holding unit 2404 may also hold one or more pairs of time difference information from a reference nation (for example, Japan) and nation identifier.

The map display unit 2405 displays map information. The map display unit 2405 displays map information of the map information storage unit 2402 in the display unit. The map information unit 2405 may or may not contain the display. When the map display unit 2405 does not contain display, the map display unit 2405 instructs an external display to show the map information.

The moving picture display unit 2406 displays one or more moving pictures in a manner visually expressing the position information as attribute value of the pertinent moving picture. The moving picture display unit 2406 displays the moving picture corresponding to the present time when issuing the moving picture. That is, when the present time is in the evening, the moving picture display unit 2406 displays the moving picture conforming to the evening time. In such a case, time information is added to the stream of moving picture. Further, the moving picture display unit 2406 displays a moving picture corresponding to the present time in other nation by referring to the world clock in the world clock holding unit 2404 if the position information shows other nation. The moving picture display unit 2406 may or may not contain the display. If the moving picture display unit 2406 does not contain display, the moving picture display unit 2406 instructs an external display to show the moving picture. The processing procedure of the moving picture display unit 2406 for display control of moving picture is realized by software, and the software is recorded in ROM or other recording medium. It may be also realized by hardware (exclusive circuit).

The operation of the moving picture display device is explained below by referring to the flowchart in FIG. 25. Operation of the moving picture display device may be started by user's instruction, instruction from other device, or automatically.

(Step S2501) The map display unit 2405 acquires map information from the map information storage unit 2402.

(Step S2502) The map display unit 2405 displays the map from the map information acquired at step S2501.

(Step S2503) The moving picture display unit 2406 puts "1" in counter i.

(Step S2504) The moving picture display unit 2406 judges if i-th moving picture is present in the moving picture storage unit 2401 or not. The process goes to step S2505 if i-th moving picture is present, or is terminated if not present.

(Step S2505) The moving picture display unit 2406 acquires attribute value "position information" of i-th moving picture.

(Step S2506) The moving picture display unit 2406 determines the display position of i-th moving picture on the basis of position information acquired at step S2505.

(Step S2507) The moving picture display unit 2406 acquires attribute value "nation identifier" of i-th moving picture.

(Step S2508) The present time acquiring unit 2403 acquires the present time, and the moving picture display unit 2406 determines the time on the basis of the nation identifier acquired at step S2507 and the present time. The moving picture display unit 2406 usually determines the time also by using the information of the world clock holding unit 2404.

(Step S2509) The moving picture display unit 2406 determines the output start position of i-th moving picture on the basis of the time acquired at step S2508. The output start time is the position indicating the first field to be issued in the stream of moving picture.

(Step S2510) The moving picture display unit 2406 issues a moving picture from the field indicated by the output start position determined at step S2509. Unless interrupted by input of end time, the moving picture once issued continues to be issued in parallel.

(Step S2511) The counter i is incremented by 1. Then the process returns to step S2504.

Figures 25, 26:
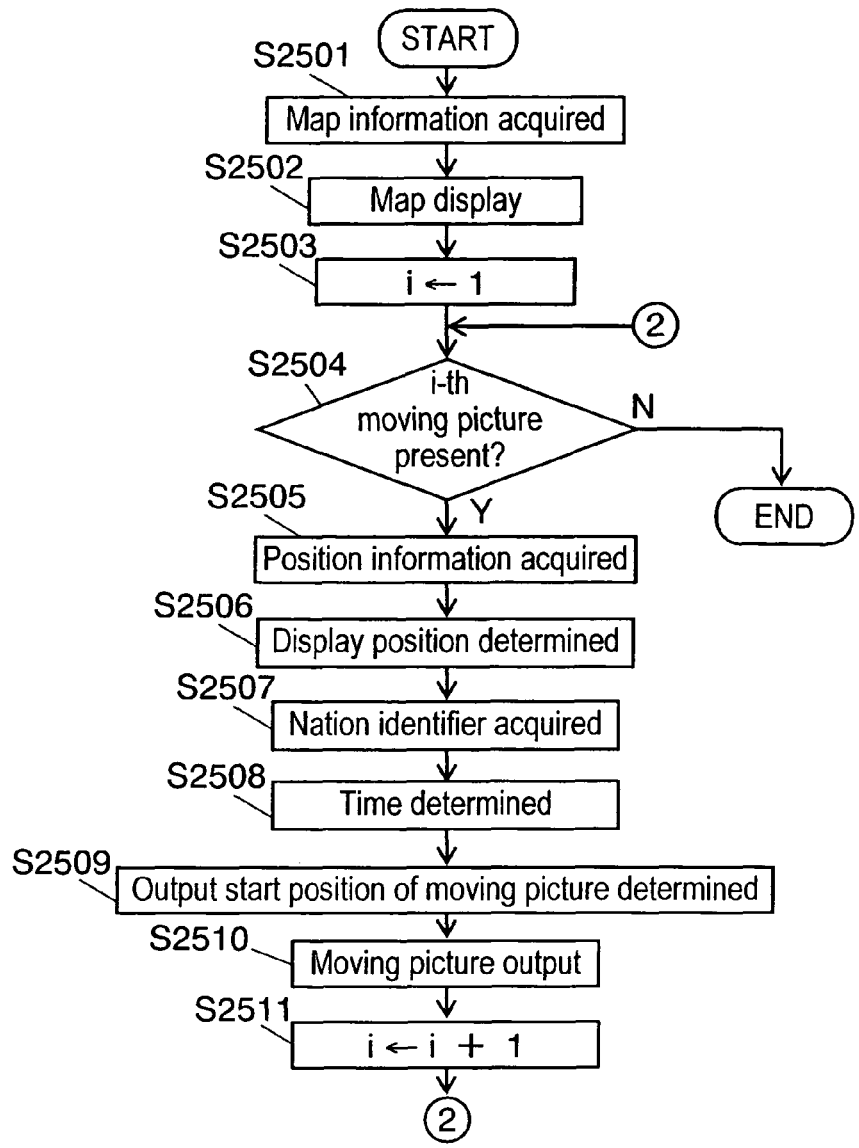
FIG. 25 is a flowchart of operation of moving picture display device in preferred embodiment 4.
FIG. 26 is a diagram of moving picture control table in preferred embodiment 4.

In the flowchart in FIG. 25, output of map information is not always necessary. It is not required to issue moving picture on the basis of present time or world clock. That is, when the moving picture display device displays a moving picture, the position information as attribute value of this moving picture is expressed visually. The moving picture and position information are related in some manner or other.

A specific operation of the moving picture display device in the preferred embodiment is explained. This moving picture display device is, for example, an information processing device of sightseeing guide installed in a tourist office. The moving picture display device holds a moving picture management table shown in FIG. 26. The moving picture management table stores one or more records showing the ID, moving picture identifier, position information, nation identifier, and moving picture. The moving picture identifier, position information, and nation identifier are attribute values of the moving picture. The position information herein is (latitude, longitude), but may be information showing other position. The nation identifier is the information for identifying a nation. The nation identifier may be a nation code or the like. Herein, time information is added in part or whole of the field (still picture) composing the moving picture.

The moving picture display device holds map information in FIG. 27. Herein, FIG. 27 is the information showing the world map. The moving picture display device also holds world clock information management table in FIG. 28. The world clock information management table stores one or more records having the ID, nation identifier and time difference.

In such a case, the moving picture display device is started, for example, by user's instruction, and shows plural maps and moving pictures as shown in FIG. 29. The moving picture display device displays moving pictures of sightseeing in Kyoto, sightseeing in America, and sightseeing in China, at positions of corresponding maps, on the basis of the position information of the moving pictures.

The moving picture display device displays the moving picture corresponding to the present time on the basis of the present time and time difference information. For example, when the present time is 13:00 in Japan time, the moving picture display device displays a daytime moving picture in sightseeing in Kyoto, and nighttime moving picture (20:00) in sightseeing in America, and a daytime moving picture in sightseeing in China.

According to the preferred embodiment, the moving picture display device displays the moving picture in a manner of visually expressing the position information which is the attribute value of the moving picture.

In the preferred embodiment, the moving picture display device displays the moving picture in consideration of the present time. The moving picture display device further displays the moving picture in consideration of the world time zone.

Hence, this moving picture display device may be preferably used as information display means for sightseeing guide or the like.

Figure 30:
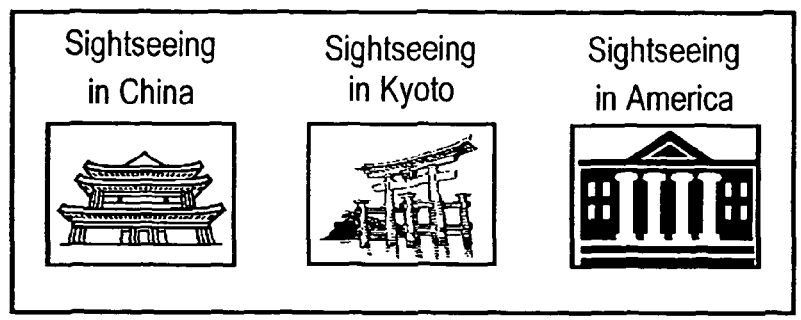
FIG. 30 is a diagram of display example of moving picture in preferred embodiment 4.

In the preferred embodiment, map display is not always necessary when displaying the moving picture. That is, instead of the display in FIG. 29, plural moving pictures may be displayed as shown in FIG. 30. The moving picture display in FIG. 30 shows the moving picture located at the west side at the left side. That is, the moving picture display device displays the moving picture in a manner to express visually the position information corresponding to the moving picture.

In the preferred embodiment, it is not essentially required to display the moving picture in consideration of the present time or time difference.

In the preferred embodiment, the moving picture display device is a stand-alone type, but the moving picture may be displayed by a client device by instruction from client device if data is present in a server device.

Further, processing in the preferred embodiment may be realized by software. The software may be distributed by downloading. Or the software may be recorded and distributed in recording medium such as CD-ROM. The software for realizing the information processing device in the preferred embodiment is a program described below. That is, this program is a program for causing a computer to execute a step of determining the display position of moving picture on the basis of position information forming pair with one or more moving pictures, and a step of displaying one or more moving pictures at position indicated by the display position.

Preferred Embodiment 5

This preferred embodiment relates to a moving picture display device for composing selection menu of moving pictures by accepting selection of moving picture being reproduced, during reproduction of plural moving pictures on the basis of schedule information, in which the schedule information is changed on the basis of the selected moving picture when one moving picture is selected, and thereby the reproduction sequence of moving pictures is changed.

Figure 31:
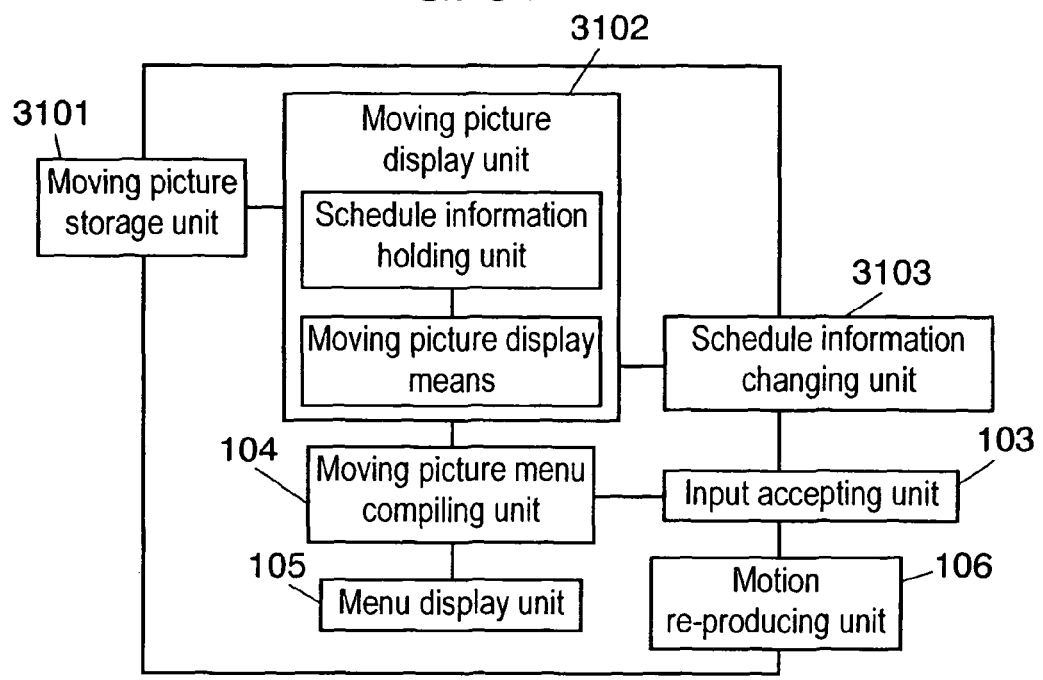
FIG. 31 is a block diagram of configuration of moving picture processing device in preferred embodiment 5.

FIG. 31 is a block diagram of moving picture display device in this preferred embodiment. The moving picture display device comprises a moving picture storage unit 3101, a moving picture display unit 3102, an input accepting unit 103, a moving picture menu compiling unit 104, a menu display unit 105, a motion reproducing unit 106, and a schedule information changing unit 3107. The moving picture display unit 3102 includes schedule information holding unit 31021, and moving picture display means 31022.

The moving picture storage unit 3101 stores moving pictures and one or more sets of characteristic value as information about characteristic of moving pictures. The moving picture storage unit 3101 is preferably a nonvolatile recording medium, but may be also realized by a volatile recording medium.

The schedule information changing unit 3107 changes the schedule information held in the schedule information holding means 31021 on the basis of the accepted input when the input accepting unit 103 accepts input about display of moving picture. Specific algorithm for changing the schedule information is described below. The schedule information changing unit 3107 is usually realized by MPU or other memory. The processing procedure of the schedule information changing unit 3107 is realized by software, and the software is recorded in ROM or other recording medium. It may be also realized by hardware (exclusive circuit).

The schedule information holding unit 31021 holds schedule information as information about schedule for displaying plural moving pictures. Data structure of schedule information is not specified. Schedule information is not always required to be present as entity information, but the sequence of moving pictures stored in the moving picture storage unit 3101 may be considered to be schedule information. A specific example of schedule information is given later. The schedule information holding unit 31021 may be either nonvolatile recording medium or volatile recording medium.

The moving picture display means 31022 displays whole or part of plural moving pictures sequentially on the basis of the schedule information. The moving picture display means 31022 displays whole or part of unshown plural moving pictures sequentially on the basis of the changed schedule information when the schedule information is changed by the schedule information changing unit 3107. The moving picture display means 31022 is usually realized by MPU or other memory. The processing procedure of the moving picture display means 31022 for displaying moving pictures is realized by software and/or hardware (exclusive circuit). The moving picture display means 31022 may either include a display or control output to an external display.

Figure 32:
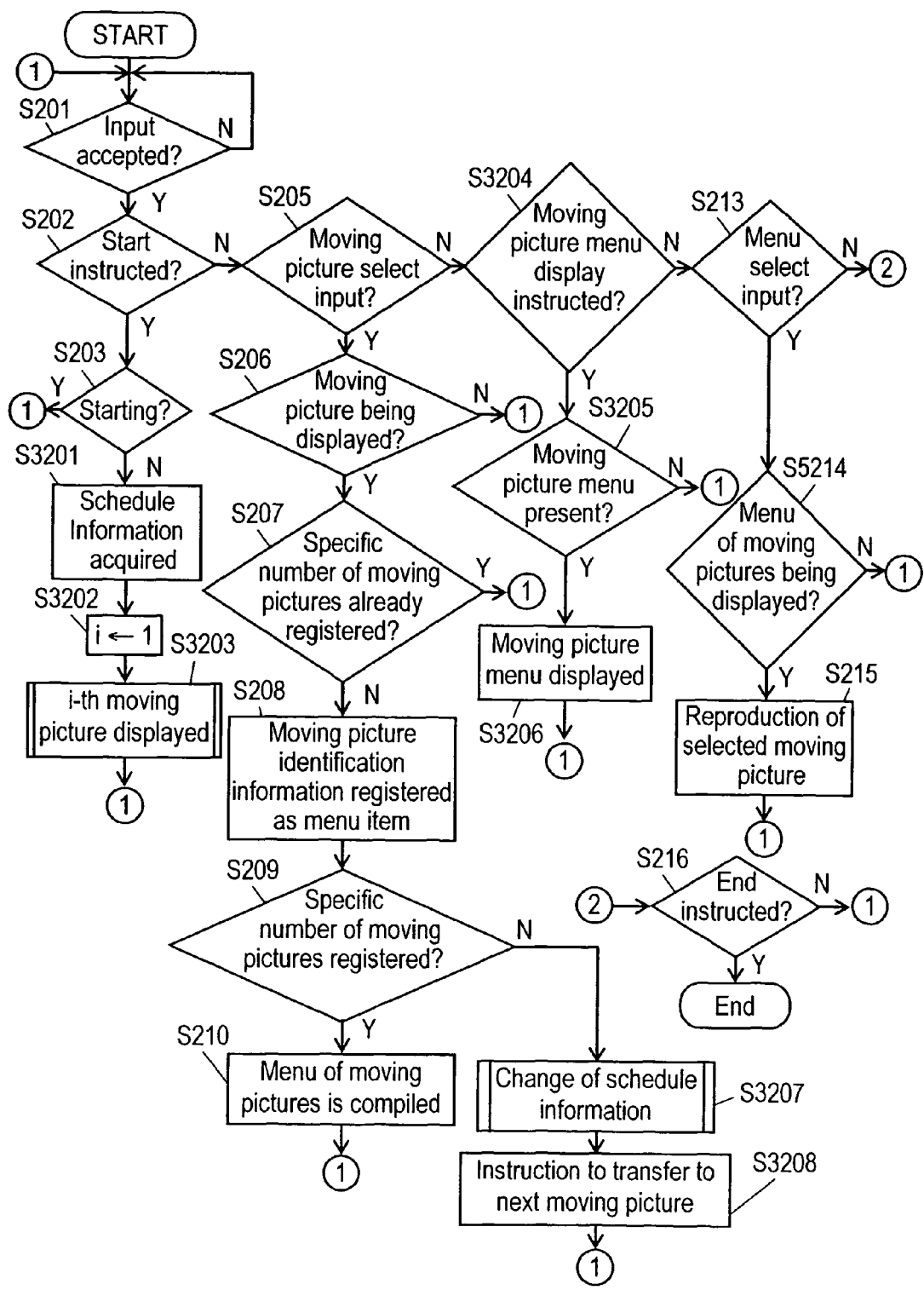
FIG. 32 is a flowchart of operation of moving picture processing device in preferred embodiment 5.

Operation of the moving picture processing device is explained by referring to the flowchart in FIG. 32. Explanation is omitted about same steps as in the flowchart in FIG. 2.

(Step S3201) The moving picture display means 31022 acquires schedule information held in the schedule information holding means 31021.

(Step S3202) The moving picture display means 31022 puts "1" in counter i.

(Step S3203) The moving picture display means 31022 displays i-th moving picture on the basis of schedule information acquired at step S3201. This operation of display of moving picture is carried out parallel to operation at other step. That is, during display of moving picture, input from the user can be accepted. When display of one moving picture is over, it is incremented, and i-th moving picture is displayed successively.

(Step S3204) It is judged if the input accepted at step S201 is an input for instruction of display of moving picture menu or not. The process goes to step S3205 in the case of input for instruction of display of moving picture menu, or jumps to step S213 otherwise.

(Step S3205) The menu display unit 105 judges if the moving picture menu is registered or not. Suppose the moving picture menu compiled at step S210 is registered automatically. The process goes to step S3206 when the moving picture menu is registered, or returns to step S201 if not registered.

(Step S3206) The menu display unit 105 displays the registered moving picture menu. Then the process returns to step S201.

(Step S3207) The schedule information changing unit 3107 changes the schedule information held in the schedule information holding means 31021, corresponding to selection of moving picture. Detail of changing process of schedule information is explained later by referring to the flowchart in FIG. 33.

(Step S3208) The schedule information changing unit 3107 instructs the moving picture display means 31022 to jump the moving picture display of the moving picture display means 31022 to next moving picture. Then the process returns to step S201.

Operation of the schedule information changing unit 3107 for changing the schedule information is explained by referring to the flowchart in FIG. 33.

(Step 3301) The schedule information changing unit 3107 acquires characteristic value of moving picture selected at step S205. Herein, the moving picture storage unit 3101 is supposed to store moving pictures and one or more sets of characteristic value as information about the characteristic of moving pictures. The characteristic value is the information showing the nature of moving picture, and a specific example is explained below.

(Step 3302) The schedule information changing unit 3107 puts "1" in counter j.

(Step 3303) The schedule information changing unit 3107 judges if j-th unshown moving picture is present or not. The process goes to step S3304 if j-th unshown moving picture is present, or jumps to step S3308 if not present.

(Step 3304) The schedule information changing unit 3107 acquires the characteristic value of j-th unshown moving picture from the moving picture storage unit 3101.

(Step 3305) The schedule information changing unit 3107 calculates approximation of the characteristic value of moving picture acquired at step S3301 and the characteristic value of moving picture obtained at step S3304. Algorithm for determining approximation (or similarity) is not specified. The technique for obtaining approximation of plural pieces of information on the basis of characteristic values of plural pieces of information is known, and various methods are available.

(Step 3306) The schedule information changing unit 3107 accumulates the moving picture identifier as information for identifying j-th unshown moving picture and the approximation calculated at step S3305 in a pair.

(Step 3307) The schedule information changing unit 3107 increments j by 1. Then the process returns to step S3303.

(Step 3308) The schedule information changing unit 3107 sorts the moving picture identifier on the basis of plural values of approximation accumulated at step S3306. The sorting technology is a known art, and its explanation is omitted.

(Step 3309). The schedule information changing unit 3107 updates the schedule information so as to reproduce in the sequence of moving pictures identified by the moving picture identifier sorted at step S3308. The process is terminated.

Specific operation of moving picture processing system comprising the moving picture processing device in the preferred embodiment is explained. The concept of the moving picture processing system is same as shown in FIG. 3. FIG. 34 shows a moving picture management table of moving picture storage unit 101. The moving picture management table holds one or more records having ID, moving picture identification information, characteristic value, and moving picture. The characteristic value is the attribute value of moving picture including the rating of serious, hard-boiled, fairy tale, and home drama. Rating of serious shows the degree of seriousness of the moving picture. A greater value means a more serious moving picture. Rating of hard-boiled shows the degree of hard-boiled level. Rating of fairy tale shows the degree of fairy. Rating of home drama shows the degree of at-home atmosphere.

Figures 35, 36, 37, 38:
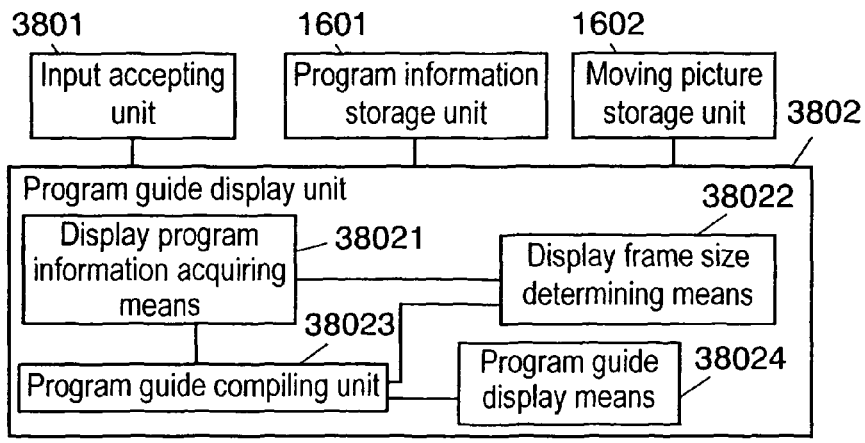
FIG. 35 is a diagram of schedule information control table in preferred embodiment 5.
FIG. 36 is a diagram of approximation table in preferred embodiment 5.
FIG. 37 is a diagram of schedule information control table in preferred embodiment 5.
FIG. 38 is a block diagram of configuration of information processing device in preferred embodiment 6.

FIG. 35 shows a schedule information management table of schedule information holding means 31021. The moving picture display means 31022 displays moving pictures sequentially according to the schedule information management table. In the case of the schedule information management table in FIG. 35, the moving picture display means 31022 plans to display moving picture X of ID=1 at first, followed sequentially by moving picture Y, . . . , moving picture N.

In this moving picture processing device, first, the user starts the moving picture processing device by using the remote controller. Specifically, the power button of the remote controller is pressed.

When the moving picture processing device is started, the moving picture processing device reads out the moving pictures from the moving picture storage unit 3101 and displays in the display unit in the sequence conforming to the schedule information management table in FIG. 35. First, the moving picture processing device reads out and displays moving picture X. Suppose the user does not like moving picture X, and does not select moving picture X. As a result, the moving picture processing device reads out and displays moving picture Y. This user likes home drama, and selects moving picture Y by the remote controller.

Consequently, the moving picture processing device reads out the characteristic values of moving picture Y, serious rating of 1, hard-boiled rating of 1, fairy tale rating of 2, and home drama rating of 9. The moving picture processing device reads out characteristic values of unshown moving pictures sequentially. From the read characteristic values of unshown moving pictures and characteristic values of the selected moving picture, approximation of unshown moving pictures and moving picture Y is calculated. The approximation is the total of absolute values of difference of four characteristic values of two moving pictures. Now, the moving picture processing device reads out all characteristic values of moving picture Z of ID=3. The moving picture processing device calculates the difference between serious rating of 1 of moving picture Y and serious rating of 7 of moving picture Z (7−1=6), the difference between hard-boiled rating of 1 of moving picture Y and hard-boiled rating of 5 of moving picture Z (5−1=4), the difference between fairy tale rating of 2 of moving picture Y and fairly tale rating of 3 of moving picture Z (3−2=1), and the difference between home drama rating of 9 of moving picture Y and home drama rating of 1 of moving picture Z (9−1=8), and sums up the total of differences (6+4+1+8=19). That is, the approximation of moving picture Y and moving picture Z is 19. When the approximation value is smaller, the similarity is higher, and when the value is larger, the similarity is lower. Next, the moving picture processing device reads out the characteristic values of moving picture of ID=4, compares the characteristic values of moving picture of ID=4 with characteristic values of moving picture Y, and calculates the approximation of moving picture of ID=4 with moving picture Y. Similarly, the moving picture processing device calculates the approximation of moving pictures of ID=5, ID=6, . . . , ID=N, with moving picture Y. Thus, the moving picture processing device acquires an approximation table as shown in FIG. 36. The approximation table manages one or more records having the moving picture identification information and approximation. This is a table showing approximation between the moving picture identified by moving picture identification table, and the selected moving picture Y. The moving picture processing device sorts the approximation table in the ascending order (from smaller value up) using the approximation as the key. As a result, new schedule information is acquired, which includes one or more records having the ID and moving picture identification information. The ID is given sequentially from integer 1 (see FIG. 37).

According to this new schedule information, the moving picture processing device displays moving picture A. If the user does not select moving picture A, the moving picture processing device displays moving picture N. If the user selects moving picture A, on the basis of moving picture A, again, new schedule information is created similarly so as to display moving pictures similar to moving picture A sequentially.

According to the preferred embodiment, by accepting selection of moving picture being reproduced during reproduction of plural moving pictures, the moving picture processing device composing selection menu of moving pictures can change the schedule of display of moving pictures and change the sequence of reproduction of moving pictures, on the basis of the selected moving picture when one moving picture is selected. In this processing, moving pictures preferred by the user can be found out earlier, and a menu can be composed in a short time when compiling a menu of moving pictures.

In the preferred embodiment, the schedule information is updated every time a displayed moving picture is selected, but the schedule information may be updated only when the moving picture is selected for the first time, and the updating timing of schedule information is not specified.

In the preferred embodiment, algorithm of changing schedule information is not specified. For example, a moving picture may be characterized by one characteristic value alone. Or the schedule information may be changed so as to display from the moving picture not similar to the selected moving picture. By such changing method of schedule information, a well-balanced menu of moving pictures may be compiled in a shorter time. That is, in the moving picture processing device for displaying plural moving pictures sequentially, accepting an input on the displayed moving picture, composing the menu by the accepted moving pictures, and displaying the menu of these moving pictures, the moving picture processing device is only required to change the sequence of display of unshown moving pictures, out of plural moving pictures, on the basis of input on the displayed moving picture.

In the preferred embodiment, structure of schedule information is not specified.

The software for realizing the process of the moving picture processing device in the preferred embodiment is a program described below. That is, this program is a program for causing a computer to execute a moving picture display step of displaying whole or part of stored plural moving pictures sequentially, an input accepting step of accepting an input on a display of moving picture, a moving picture menu compiling step of compiling a menu from moving pictures displayed when accepting an input at the input accepting step, and a menu display step of displaying a menu of moving pictures compiled at the moving picture menu compiling step, in which the display sequence of moving pictures at the moving picture display step is changed on the basis of the input accepted at the input accepting step.

Preferred Embodiment 6

This preferred embodiment relates to an information processing device for displaying an electronic program guide, and more specifically this information processing device is capable of changing the display frame size as the size of frame for displaying program information, on the basis of one or more pieces of time zone information possessed by one or more pieces of program information being displayed.

FIG. 38 is a block diagram of configuration of information processing device in this preferred embodiment. The information processing device comprises a program information storage unit 1601, a moving picture storage unit 1602, an input accepting unit 3801, and a program guide display unit 3802. The program guide display unit 3802 includes display program information acquiring means 38021, display frame size determining means 38022, program guide compiling means 38023, and program guide display means 38024.

The input accepting unit 3801 accepts an input of instruction of display of electronic program guide, instruction of move of displayed electronic program guide, and instruction of end of display of electronic program guide. Instruction of move is an instruction to change over the program information to be displayed on the screen, or a scroll instruction. The input means includes remote controller, numeric key, keyboard, mouse, menu screen, etc. The input accepting unit 3801 is realized by infrared photo detector for receiving signal from infrared remote controller, device driver of input means such as numeric key or keyboard, control software of menu screen, etc.

The display program information acquiring means 38021 acquires program information to be displayed from the program information storage unit 1601, according to the move instruction of electronic program guide instructed and displayed by the electronic program guide accepted in the input accepting unit 3801.

The display frame size determining means 38022 determines the display frame size of one or more pieces of program information to be displayed on the basis of one or more pieces of time zone information possessed by one or more pieces of program information acquired in the display program information acquiring means 38021. The display frame size determining means 38022 is usually realized by MPU or other memory. The processing procedure of the display frame size determining means 38022 is realized by software, and the software is recorded in ROM or other recording medium. It may be also realized by hardware (exclusive circuit).

The program guide compiling means 38023 compiles an electronic program guide on the basis of the display frame size determined in the display frame size determining means 38022 and one or more pieces of program information acquired in the display program information acquiring means 38021. The program guide compiling means 38023 is usually realized by MPU or other memory. The processing procedure of the program guide compiling means 38023 is usually realized by software, and the software is recorded in ROM or other recording medium. It may be also realized by hardware (exclusive circuit).

The program guide display means 38024 displays an electronic program guide compiled by the program guide compiling means 38023. The program guide display means 38024 may or may not contain display. The program guide display means 38024 is realized by driver software of display, or driver software of display and display.

Figure 39:
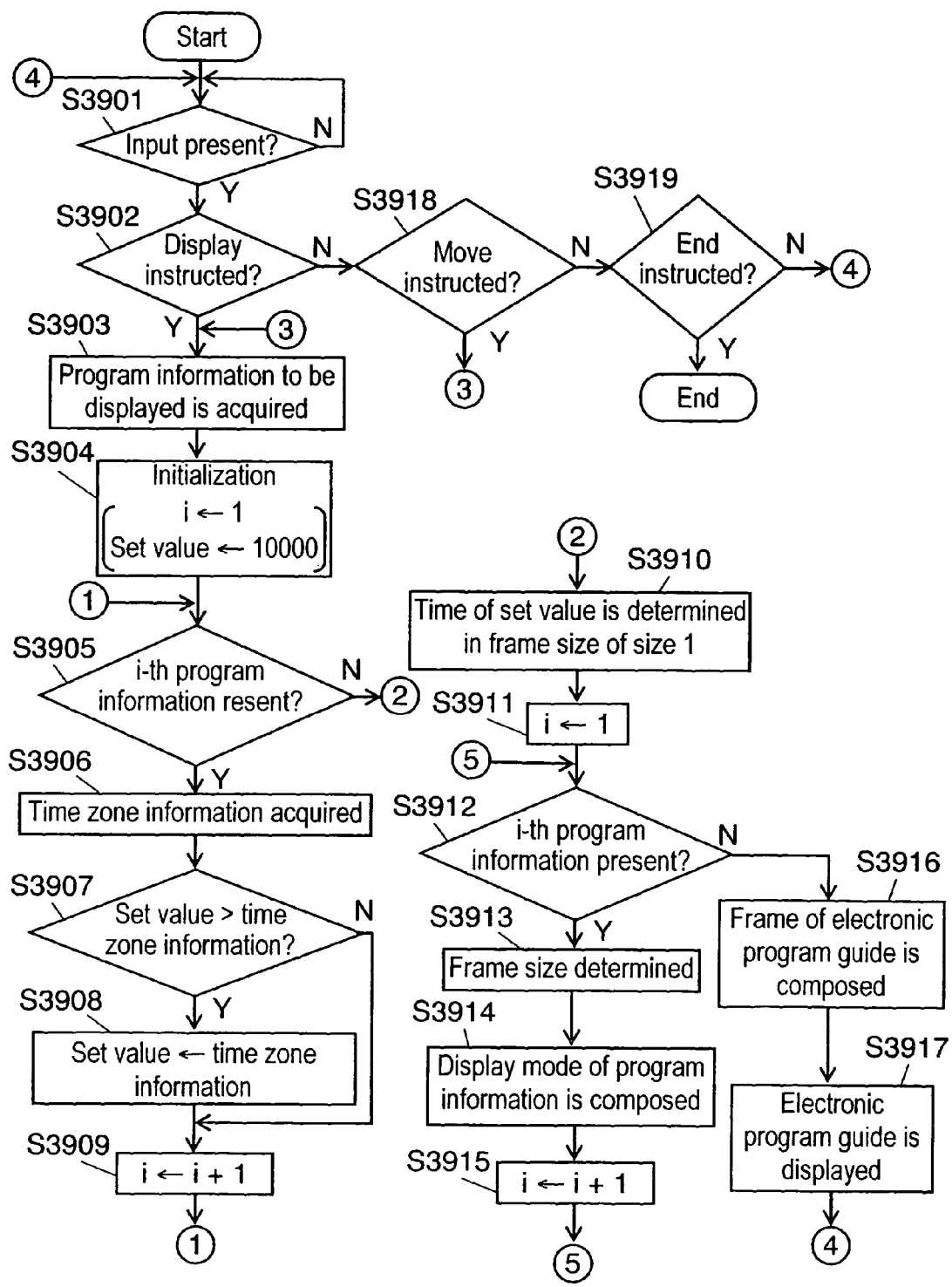
FIG. 39 is a flowchart of operation of information processing device in preferred embodiment 6.

Operation of the information processing device is explained by referring to the flowchart in FIG. 39.

(Step S3901) The input accepting unit 3801 judges if an input is accepted or not. The process goes to step S3902 when input is accepted, or jumps to step S3918 if not accepted.

(Step S3902) The input accepting unit 3801 judges if the input accepted at step S3901 is display instruction of electronic program guide or not. The process goes to step S3903 if display of electronic program guide is instructed, or jumps to step S3918 otherwise.

(Step S3903) The display program information acquiring means 38021 acquires program information to be displayed from the program information storage unit 1601. The program information to be displayed is, for example, the program information first displaying the electronic program guide, and located at the position stored at the time of end of display (channel, time zone). The program information to be displayed may be program information at a fixed position (channel, time zone) when displaying electronic program information.

(Step S3904) The display frame size determining means 38022 initializes. Initializing is to put "1" in counter i. Initializing is also a process of putting 10000 (10000 is time zone information unable to be possessed in program information) in the setting value as necessary value when setting the frame size.

(Step S3905) The display frame size determining means 38022 judges if i-th program information is present or not in the program information acquired at step S3903. The process goes to step S3906 if i-th program information is present, or jumps to step S3910 is not present.

(Step S3906) The display frame size determining means 38022 acquires time zone information possessed in i-th program information. The time zone information is the information showing the on-air time of the program, and it may be calculated from the program start time and program end time possessed in the program information, or it may be program output time possessed in the program information. When the program zone information is the program output information possessed in program information, the program information possesses the program start time and program output time.

(Step S3907) The display frame size determining means 38022 judges if the setting value is greater than the time zone information acquired at step S3906 or not. The process goes to step S3908 if the setting value is greater than the time zone information, or jumps to step S3909 if smaller.

(Step S3908) The display frame size determining means 38022 puts the time zone information in the setting value.

(Step S3909) The display frame size determining means 38022 increments counter i by 1. Then the process returns to step S3905.

(Step S3910) The display frame size determining means 38022 determines the display frame size of program information on the basis of the length of the duration indicated by setting value as reference size of size 1. The display frame size determining means 38022 determines, for example, when the duration indicated by setting value is 15 minutes, the display frame of 15-minute program width as size 1, the display frame of 30-minute program width as size 2, and the display frame of 60-minute program width as size 4.

(Step S3911) The program guide compiling means 38023 puts "1" in counter i.

(Step S3912) The program guide compiling means 38023 judges if i-th program information is present or not. This program information is the program information to be displayed acquired at step S3903.

(Step S3913) The program guide compiling means 38023 acquires time zone information of i-th program information, and determines the frame size of i-th program information from this time zone information and frame size obtained at step S3910.

(Step S3914) The program guide compiling means 38023 compiles a display format of program information by the frame size determined at step S3913. To compile a display format of program information is to composed a program image to be displayed. The program guide compiling means 38023 compiles the display format of program information, for example, on the basis of title of the program possessed in the program information, and moving picture corresponding to the program information. The moving picture is present in the moving picture storage unit 1602.

(Step S3915) The program guide compiling means 38023 increments counter i by 1. Then the process returns to step S3912.

(Step S3916) The program guide compiling means 38023 compiles a frame of electronic program guide. This frame is the entire frame of electronic program guide, and includes, for example, channel number on the axis of ordinates and time information on the axis of abscissas.

(Step S3917) The program guide display means 38024 displays an electronic program guide compiled by the program guide compiling means 38023. This electronic program guide usually contains the moving picture for specifying the program, but may not contain.

(Step S3918) The input accepting unit 3801 judges if the input accepted at step S3901 is move instruction of electronic program guide or not. The process goes to step S3903 if move of electronic program guide is instructed, or goes to step S3919 if not instructed. Move instruction is executed by pressing, for example, the cross key of the remote controller. When the user presses the right arrow button of cross key, the electronic program guide is scrolled to left.

(Step S3919) The input accepting unit 3801 judges if the input accepted at step S3901 is end instruction of display of electronic program guide or not. The process is terminated if end of display of electronic program guide is instructed, or returns to step S3901 if not instructed.

In this flowchart, in the case of output of moving picture, usually the output continues. When receiving end instruction of display of program guide, output of frame of program guide and moving picture is terminated.

Specific operation of information processing device in the preferred embodiment is described below. Suppose the information processing device is holding the program information management table shown in FIG. 18. By the output time in FIG. 18, time zone information is obtained. For example, the output time of program AA is 17:00-18:00, and the time zone information is calculated as 60 minutes.

Figures 40, 41:
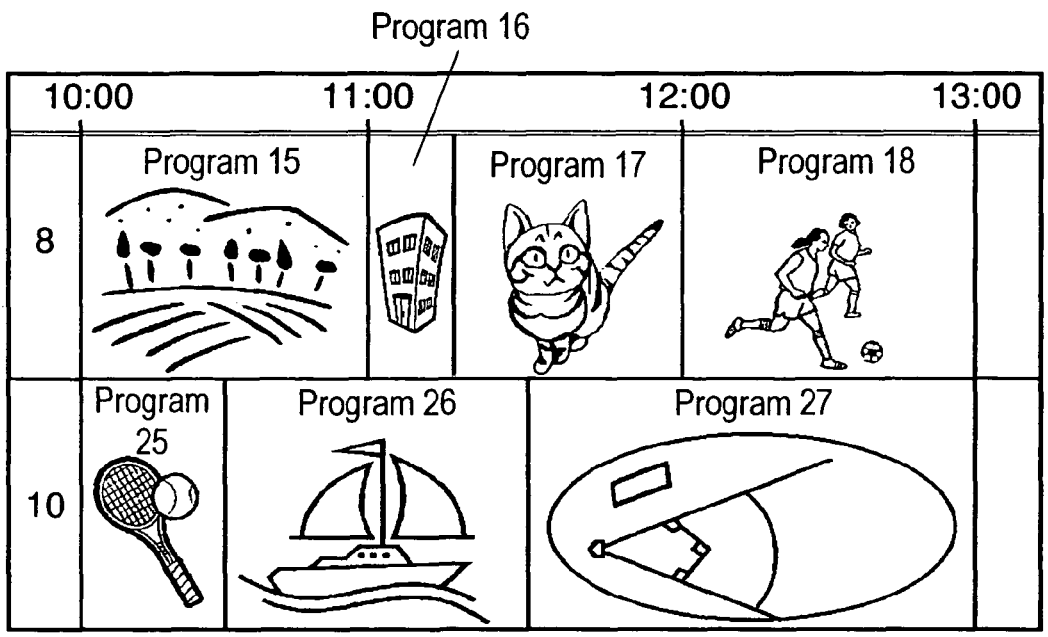
FIG. 40 is a diagram of extracted program information in preferred embodiment 6.
FIG. 41 is a diagram of output example of electronic program guide in preferred embodiment 6.

The user enters display instruction of electronic program guide from the remote controller. The information processing device extracts the program information to be displayed as shown in FIG. 40. Program information to be displayed is extracted on the basis of information of last memory of television (the last seen channel number) and information of the present time. For example, the user has last seen channel 8 and the present time is 10 a.m. In this case, the information processing device extracts program information of channel 8 and adjacent channel 10, and program information from 10:00 to 16:00.

Next, the information processing device acquires 15 minutes as the minimum value of time zone information possessed inn the extracted program information. In the extracted program information, 15-minute program is the shortest program. The information processing device set 15 minutes as size 1. The information processing device sets a 60-minute program as size 4. Its frame is smaller than size 1, it is hard to see the program information for the user.

The information processing device determines the display frame size of all programs on the basis of time zone information of all extracted programs. The information processing device further displays the title of program information and moving picture corresponding to program information on the basis of this display frame size. The information processing device composes and displays the axis of ordinates representing the channel and axis of abscissas denoting the time axis of the frame of electronic program guide. As a result, the information processing device displays an electronic program guide shown in FIG. 41. In FIG. 41, the time length of 15 minutes is size 1, and the information processing device can display the program information from 10:00 to 13:00.

Figure 42:
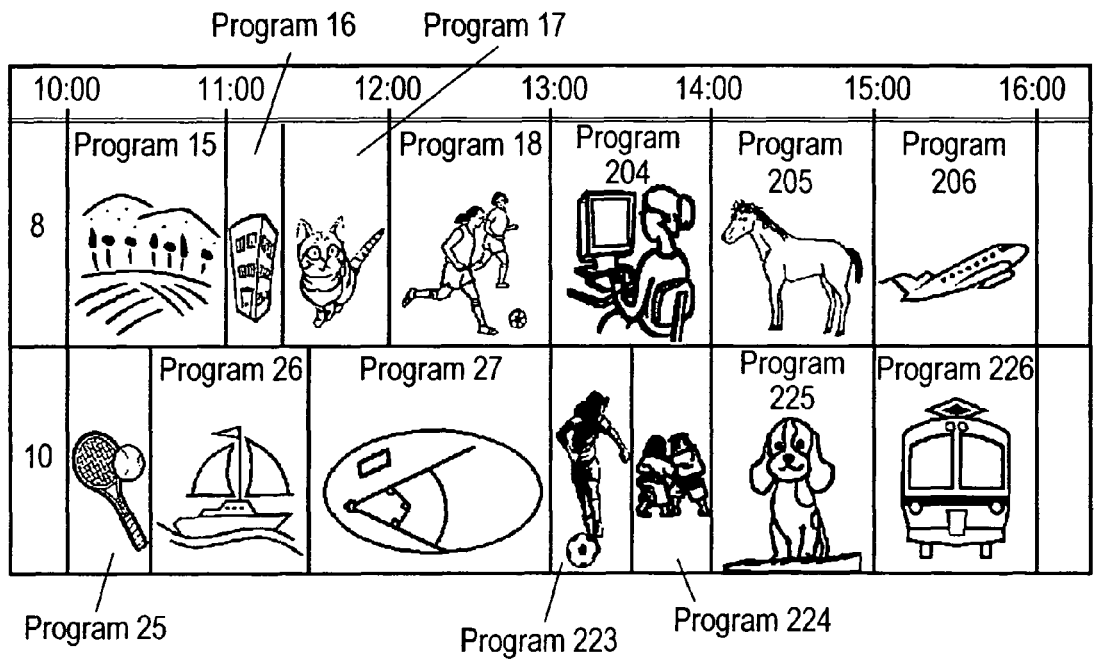
FIG. 42 is a diagram of output example of electronic program guide in preferred embodiment 6.

Incidentally, when the information processing device determines the time length of 30 minutes as size 1, as shown in FIG. 42, program information for six hours from 10:00 to 16:00 can be displayed. In this case, the shortest time of time zone information of program information to be displayed is 30 minutes.

The information processing device in the preferred embodiment is, as described herein, an information processing device for displaying an electronic program guide including one or more pieces of program information having program identifier as information for identifying a program and time zone information as information showing on-air time zone of a program, and this information processing device is capable of changing the size of frame of program information one the basis of one or more pieces of time zone information possessed in one or more displayed pieces of program information. A very easy-to-read electronic program guide is obtained by this information processing device.

According to the preferred embodiment, on the basis of program information having the shortest time zone information, the display frame size of program information of electronic program guide is determined, but the display frame size of program information of electronic program guide may be determined also by other algorithm. The information processing device may determine the size of frame of one or more pieces of program information to be displayed on the basis of one or more pieces of time zone information of one or more pieces of program information to be displayed. For example, the information processing device may determine the size of frame of program information on the basis of the longest time zone information. In such a case, multiple pieces of program information can be displayed on the screen, and it is easier to select a program to be viewed or to be reserved and recorded. Among time zone information of displayed program information, the display frame size of program information may be determined on the basis of the longest time zone information.

In the preferred embodiment, the moving picture is displayed in the program frame, but display of moving picture is not always necessary. Moving pictures can be displayed in various manners, and, for example, the moving picture is issued in a width of a region corresponding to time zone information (output time of program), or the moving picture may be cut and issued in a region depending on the time zone information. The same applies to the following preferred embodiments.

The software for realizing the information processing device in the preferred embodiment is a program described below. That is, this program is a program for causing a computer to execute an input accepting step of accepting an input of display instruction of electronic program guide, move instruction of displayed electronic program guide, or the like, a display program information acquiring step of acquiring program information to be displayed, a display frame size determining step of determining the size of display frame of one or more pieces of program information to be displayed on the basis of one or more pieces of time zone information of one or more pieces of program information acquired at the display program information acquiring step, and a step of composing and displaying an electronic program guide on the basis of the display frame size determined at the display frame size determining step.

Preferred Embodiment 7

This preferred embodiment relates to an information processing device for displaying an electronic program guide, and more specifically this information processing device is capable of changing the size of frame of program information, on the basis of time zone information possessed in the program information being focused.

Figure 43:
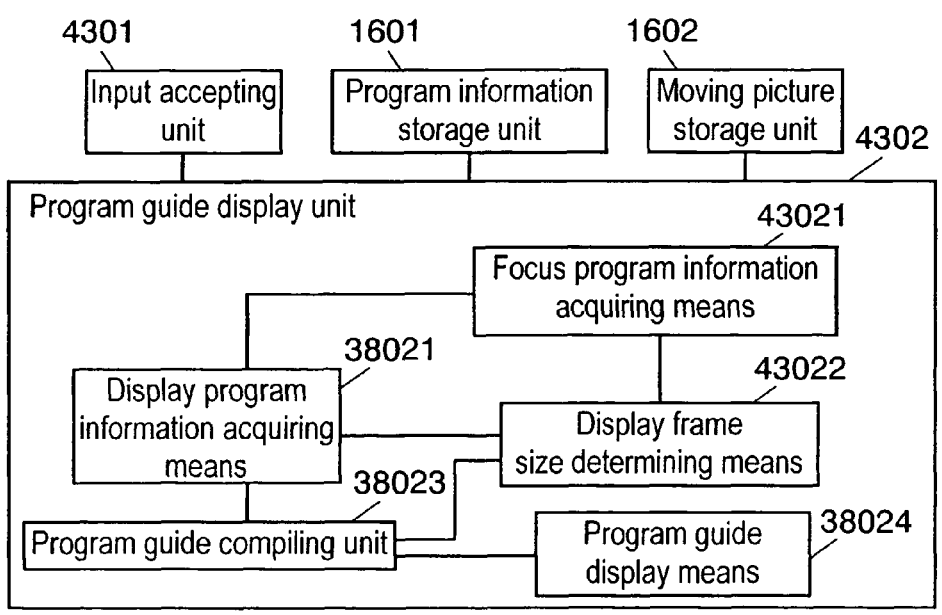
FIG. 43 is a block diagram of configuration of information processing device in preferred embodiment 7.

FIG. 43 is a block diagram of configuration of information processing device in this preferred embodiment. The information processing device comprises a program information storage unit 1601, a moving picture storage unit 1602, an input accepting unit 4301, and a program guide display unit 4302. The program guide display unit 4302 includes display program information acquiring means 38021, focus program information acquiring means 43021, display frame size determining means 43022, program guide compiling means 38023, and program guide display means 38024.

The input accepting unit 4301 accepts an input of display instruction of electronic program guide, instruction of program information to be focused, display end instruction of electronic program guide, or other instruction. Instruction of program information to be focused is to instruct program information to be noticed, out of one or more pieces of program information being displayed. The program identified by focused program information can be reserved and recorded, viewed, or reserved ad viewed. The input accepting unit 4301 is realized by the same means as in the input accepting unit 3801.

The focus program information acquiring means 43021 determines the program information to be focused on the basis of the input accepted at the input accepting unit 4301, selects from the program information acquired in the display program information acquiring means 38021, and acquires the determined program information. The focus program information acquiring means 43021 is usually realized by MPU or other memory. The processing procedure of the focus program information acquiring means 43021 is realized by software, and the software is recorded in ROM or other recording medium. It may be also realized by hardware (exclusive circuit).

The display frame size determining means 43022 determines the display frame size on the basis of the time zone information of the program information acquired in the focus program information acquiring means 43021. The display frame size determining means 43022 is usually realized by MPU or other memory. The processing procedure of the display frame size determining means 43022 is realized by software, and the software is recorded in ROM or other recording medium. It may be also realized by hardware (exclusive circuit).

Figure 44:
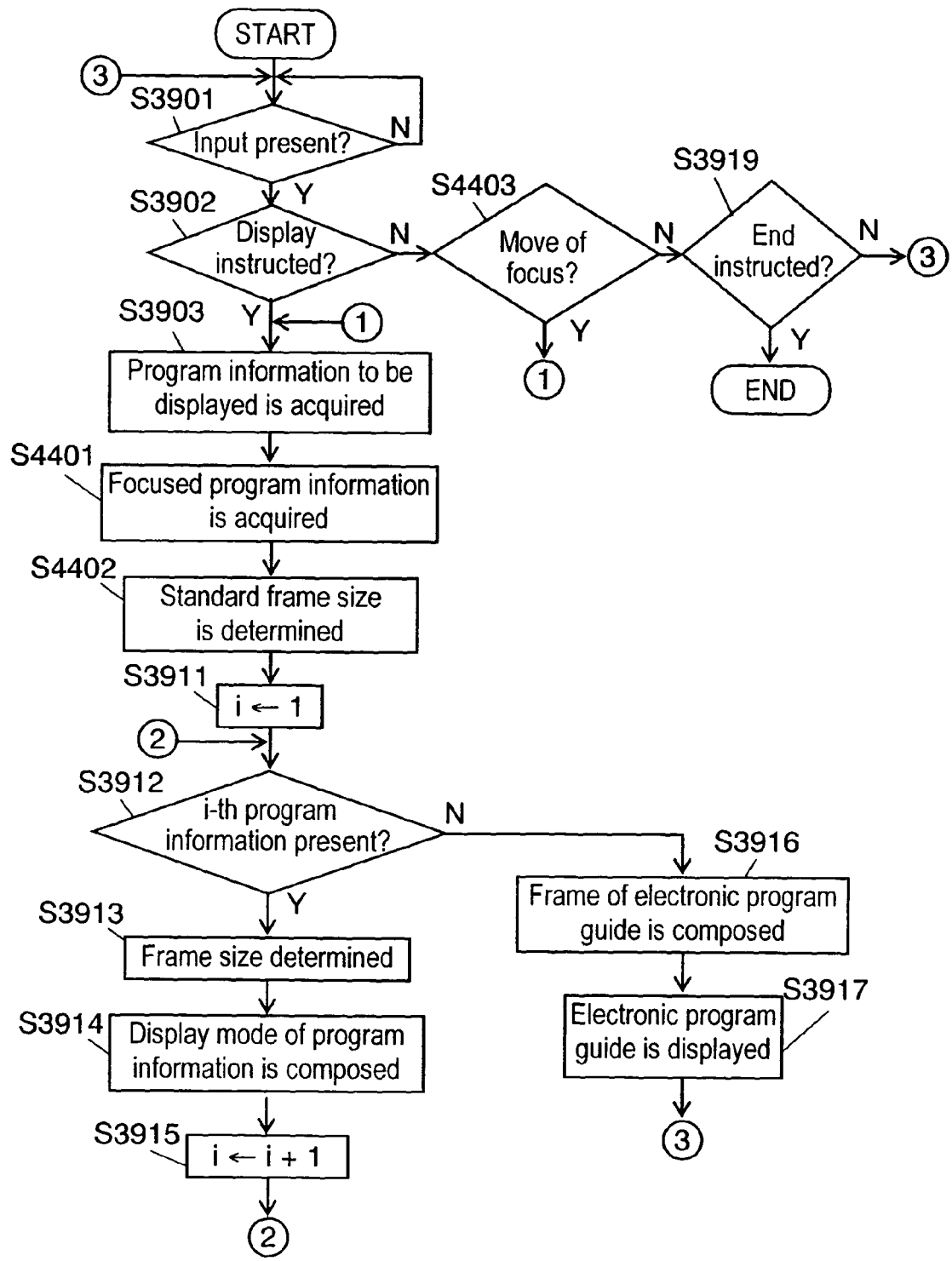
FIG. 44 is a flowchart of operation of information processing device in preferred embodiment 7.

Operation of the information processing device is explained by referring to the flowchart in FIG. 44. Explanation is omitted about the same steps as in the flowchart in FIG. 39.

(Step S4401) The focus program information acquiring means 43021 determines the program information to be focused on the basis of the input at step S3901, and acquires the program information.

(Step S4402) The display frame size determining means 43022 determines the display frame size on the basis of time zone information of the program information acquired in the focus program information acquiring means 43021. Various algorithms are available for determining the display frame size. Specific examples of algorithms are given later.

(Step S4403) The input accepting unit 4301 judges if the input accepted at step S3901 is move instruction of focus or not. The process goes to step S3903 in the case of move instruction of focus, or goes to step S3919 otherwise.

In this flowchart, when a moving picture is issued, usually, the output continues. When accepting an end instruction of display of program guide, output of program guide frame and moving picture is terminated.

Specific operation of information processing device in the preferred embodiment is described. Suppose the information processing device is holding program information management table shown in FIG. 18. By the output time in FIG. 18, time zone information is acquired. For example, the output time of program AA is 17:00-18:00, and the time zone information is calculated as 60 minutes.

The user enters display instruction of electronic program guide from the remote controller. Then the information processing device extracts the program information to be displayed as shown in FIG. 40.

Figure 45:
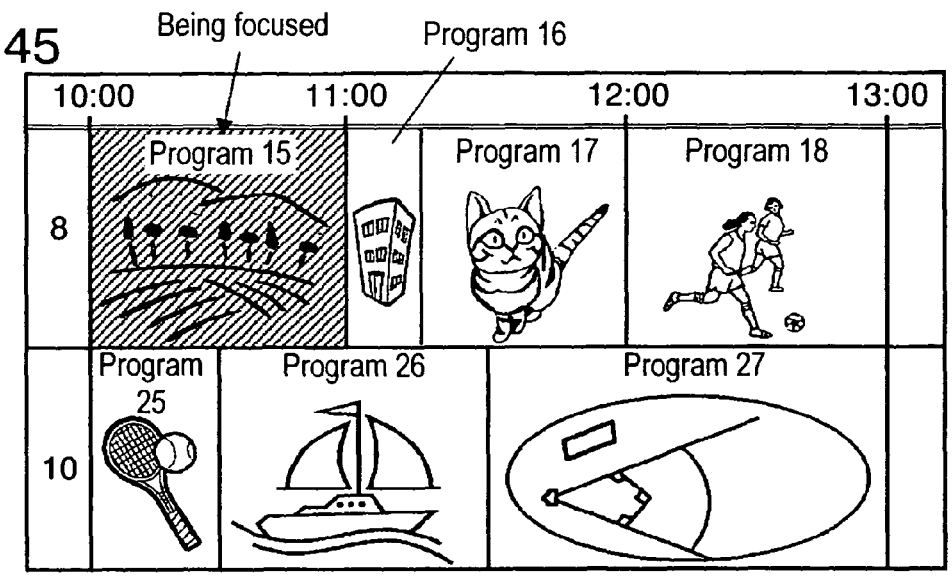
FIG. 45 is a diagram of output example of electronic program guide in preferred embodiment 7.

The information processing device acquires the focused program information. Suppose this program information is program information of program 15. Then, the information processing device displays a electronic program guide as shown in FIG. 45. In FIG. 45, program information of program 15 is focused and highlighted. In FIG. 45, program information of 30-minute program is indicated in display frame size of reference length of 2.

The user moves the focus from the frame of program 15 to program 16. In this case, the focus is moved by pressing the right arrow button of cross key of the remote controller.

Figure 46:
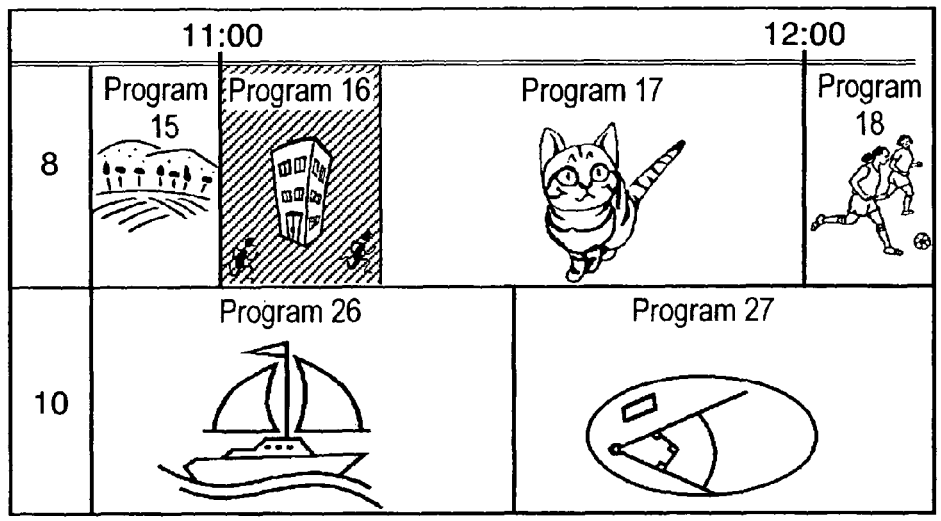
FIG. 46 is a diagram of output example of electronic program guide in preferred embodiment 7.

As a result, the information processing device acquires program information of program 16 as the program information to be focused. The information processing device acquires that the time zone information of the program information of program 16 is 15 minutes. The information processing device determines the display frame size of program information on the basis of the time length of 15 minutes. That is, the information processing device determines the time length of 15 minutes as, for example, reference size of 2, and displays program 16 in a double display frame size (double size in lateral length). Program 16 is displayed in the center of display frame, and the surrounding program information is similarly displayed in double lateral size. As a result, the information processing device displays the electronic program guide as shown in FIG. 46. In FIG. 46, the program information is displayed only from 10:15 to 12:15.

The information processing device in the preferred embodiment is an information processing device for displaying an electronic program guide including one or more pieces of program information having program identifier as information for identifying a program and time zone information as information showing the on-air time zone of the program, and this information processing device is capable of changing the size of frame of program information on the basis of the time zone information of the focused program information. By this information processing device, an electronic program guide very easy to read the focused program information can be obtained.

In the information processing device of the preferred embodiment for displaying electronic program table including one or more pieces of information having program identifier and time zone information, the information processing device is merely intended to change the size of frame of program information on the basis of the time zone information of the focused program information, and the display frame size of focused program information may be changed by any algorithm whatsoever. However, when the display frame size of other program information is changed on the basis of time zone information of focused program information, the relation between the focused program information and time zone information of other program information is not spoiled, which is more preferable.

The software for realizing the information processing device in the preferred embodiment is a program described below. That is, this program is a program for causing a computer to execute an input accepting step of accepting an input of instruction of program information to be focused, a step of acquiring time zone information of the program information focused by this input, a step of determining the size of frame of program information on the basis of the time zone information, and a step of composing and displaying an electronic program guide on the basis of the determined display size.

Preferred Embodiment 8

This preferred embodiment relates to an information processing device for displaying an electronic program guide including moving pictures, and more specifically to the information processing device capable of displaying the moving picture by changing the display method on the basis of time zone information.

Figure 47:
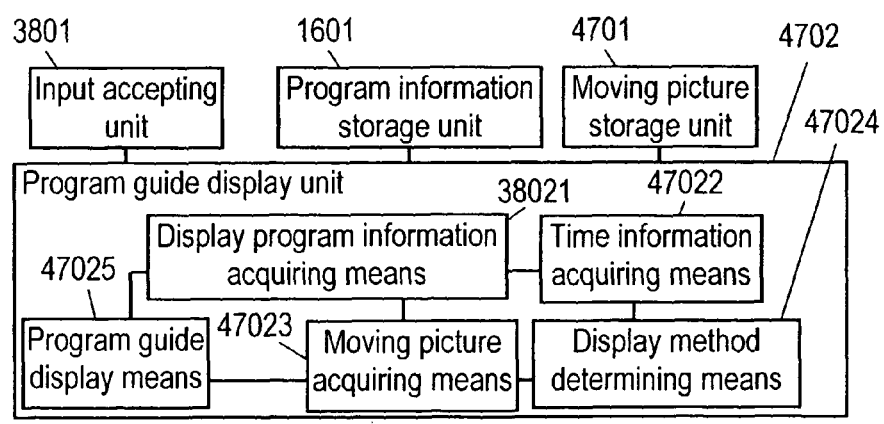
FIG. 47 is a block diagram of configuration of information processing device in preferred embodiment 8.

FIG. 47 is a block diagram of configuration of information processing device in this preferred embodiment. The information processing device comprises a program information storage unit 1601, a moving picture storage unit 4701, an input accepting unit 3801, and a program guide display unit 4702. The program guide display unit 4702 includes display program information acquiring means 38021, time zone information acquiring means 47022, moving picture acquiring means 47023, display method determining means 47024, and program guide display means 47025.

The moving picture storage unit 4701 stores one or more moving pictures for identifying program information. The moving picture is a set of still pictures composed of plural objects. A representative identifier is given to one still picture representing a moving picture. The representative identifier is information for identifying a representative still picture as a still picture representing the moving picture. The entity data of moving picture has data structure of MPEG4 or MPEG7. Method of acquiring moving picture is not specified. Moving picture may be acquired by receiving broadcast, by downloading through network, or reading out from recording medium. The moving picture storage unit 4701 is preferably a nonvolatile recording medium, but may be also realized by a volatile recording medium.

The time zone information acquiring means 47022 acquires time zone information from each program information acquired in the display program information acquiring means 38021. The time zone information acquiring means 47022 is usually realized by MPU or other memory. The processing procedure of the time zone information acquiring means 47022 is realized by software, and the software is recorded in ROM or other recording medium. It may be also realized by hardware (exclusive circuit).

The moving picture acquiring means 47023 acquires a moving picture corresponding to the program information to be displayed from the moving picture storage unit 4701. The moving picture acquiring means 47023 is usually realized by MPU or other memory. The processing procedure of the moving picture acquiring means 47023 is realized by software, and the software is recorded in ROM or other recording medium. It may be also realized by hardware (exclusive circuit).

The display method determining means 47024 determines the display method of moving picture corresponding to program information on the basis of time zone information acquired in the time zone information acquiring means 47022. Display method of moving picture includes display of moving picture, still picture, frame feed, fast feed, or part of object only for composing moving picture, reproduction of moving picture at arbitrary reproduction speed. Algorithm for determining display method of display method determining means 47024 is not specified. For example, the display method determining means 47024 holds a correspondence table of time zone information and display method, and determines the display method corresponding to the time zone information by searching from this correspondence table. The display method determining means 47024 is usually realized by MPU or other memory. The processing procedure of the display method determining means 47024 is realized by software, and the software is recorded in ROM or other recording medium. It may be also realized by hardware (exclusive circuit).

The program guide display means 47025 displays an electronic program guide having moving pictures and others on the basis of the display method determined by the display method determining means 47024. The program guide display means 47025 may or may not contain display. The program guide display means 47025 is realized by driver software of display, or driver software of display and display, etc.

Figure 48:
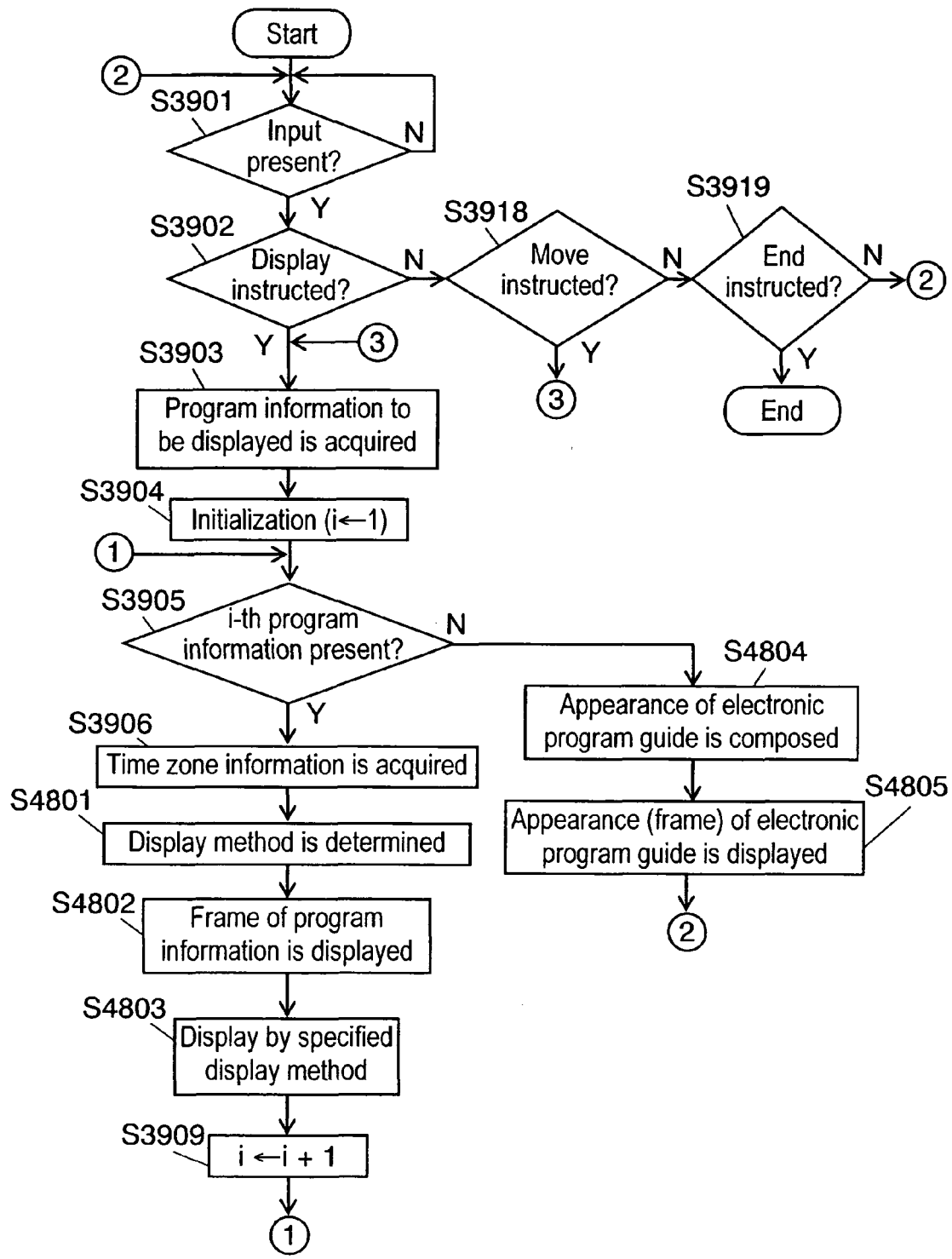
FIG. 48 is a flowchart of operation of information processing device in preferred embodiment 8.

Operation of the information processing device is explained by referring to the flowchart in FIG. 48.

(Step S4801) The display method determining means 47024 determines the display method (moving picture, still picture, frame feed, etc.) of image showing a program, on the basis of time zone information acquired in the time zone information acquiring means 47022. At step S3906, the time one information acquiring means 47022 acquires time zone information of i-th program information.

(Step S4802) The program guide display means 47025 displays the frame of i-th program information.

(Step S4803) The moving picture acquiring means 47023 acquires the moving picture corresponding to i-th program information, and the program guide display means 47025 displays an image by a display method determined at step S4801, to this moving picture. The program guide display means 47025 reproduces the moving picture as it is, reproduces at specified speed, displays a representative still picture of the moving picture, reproduces by frame feeding, or reproduces only specified object for composing the moving picture. Then the process goes to step S3908.

(Step S4804) The program guide display means 47025 composes the appearance of electronic program guide from one or more pieces of program information to be displayed. The appearance has, for example, the axis of abscissas showing the channel number and the axis of ordinates showing the time zone. The same effects are obtained if the axis of abscissas and the axis of ordinates are exchanged.

(Step S4805) The program guide display means 47025 displays the appearance of electronic program guide composed at step S4804. Then the process returns to step S3901.

In this flowchart, when a moving picture is issued, usually, the output continues. When accepting an end instruction of display of program guide, output of program guide frame and moving picture is terminated.

Specific operation of information processing device in the preferred embodiment is described. Suppose the information processing device is holding program information management table shown in FIG. 18. By the output time in FIG. 18, time zone information is acquired. For example, the output time of program AA is 17:00-18:00, and the time zone information is calculated as 60 minutes. The display method determining means 47024 holds the display method management table shown in FIG. 49. The display method management table includes one or more records having ID, time zone information, and display method. The ID is the information for identifying a record, and it is present for the sake of table management. The time zone information shows the width of time zone information. The display method is the information for identifying a display method. In the display method management method, when the time zone information of the program information or calculated from the program information is 8 minutes, it means that the display method is "object, still picture display." The "object, still picture display" means display of specified object only in the still picture having the representative identifier as information for identifying the representative still picture among still pictures representing the moving picture. The specified object is the image of the person, for example, if the still picture shows both scenery (background) and a person. Still picture display is display of representative still picture representing the moving picture. The frame feed reproduction is display method of reproduction by frame feed of moving picture. "Speed 1, moving picture reproduction" is display of moving picture at speed faster than frame feed reproduction, but slower than standard reproduction. "Object, moving picture reproduction" is display method of reproducing only specified object of still picture for composing the moving picture at moving picture speed. "Moving picture standard reproduction" is display method of moving picture at standard speed.

The user enters display instruction of electronic program guide from the remote controller. Then the information processing device reads out the program information to be displayed. Herein, the program information to be displayed is part of program information in FIG. 18. First, the information processing device acquires time zone information of 60 minutes of program AA. From the time zone information of 60 minutes, display method "speed 1, moving picture reproduction" is obtained. The moving picture corresponding to program AA is acquired from the moving picture storage unit, and this moving picture is displayed in the display method corresponding to "speed 1, moving picture reproduction."

Next, the information processing device acquires the time zone information of 15 minutes of program BB. The information processing device acquires the display method "still picture display" corresponding to time zone information of 15 minutes. The information processing device acquires the moving picture corresponding to program BB from the moving picture storage unit, and display this moving picture in the display method corresponding to the still picture display. That is, the information processing device selects and displays the representative still picture (still picture provided with representative identifier) of the pertinent moving picture.

Figures 49, 50:
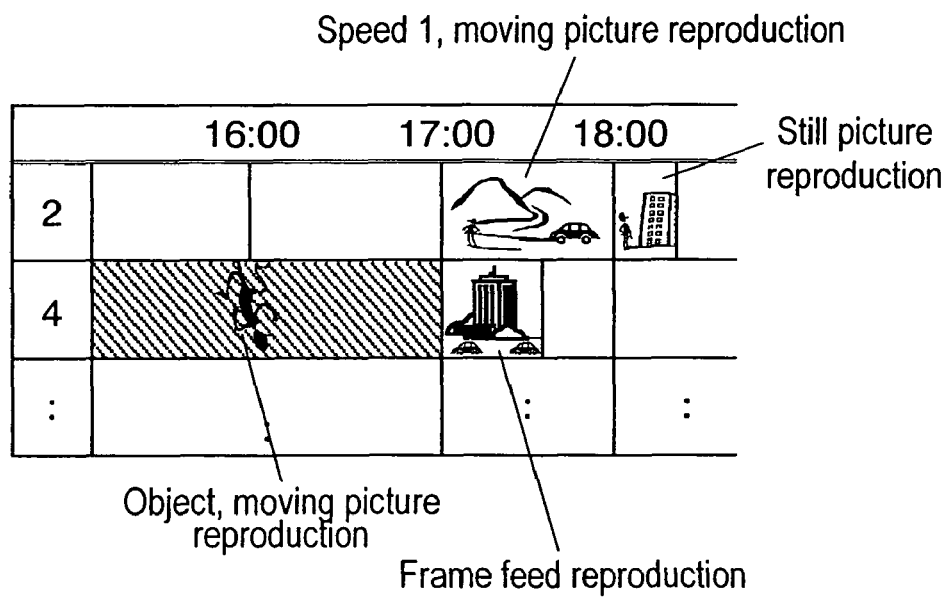
FIG. 49 is a diagram of display method control table in preferred embodiment 8.
FIG. 50 is a diagram of output example of electronic program guide in preferred embodiment 8.

Further, the information processing device displays moving pictures corresponding to all program information to be displayed by the display method shown in FIG. 49. As a result, the information processing device displays an electronic program guide as shown in FIG. 50. In FIG. 50, the display method of moving pictures differs on the basis of time zone information corresponding to program information. In such a case, the title of the program or others may be displayed.

The information processing device of the preferred embodiment is an information processing device for displaying an electronic program guide including one or more pieces of program information having program identifier, time zone, and moving picture, and this information processing device is also capable of displaying the moving picture possessed in the program information by changing the display method of moving picture on the basis of time zone information. By such information processing device, the moving picture can be displayed by conforming to the size of program frame, thereby obtaining an electronic program guide very easy to read, and easy to understand the contents of program.

According to the preferred embodiment, program information and moving picture correspond to each other, but it may be also considered that program information includes moving picture. That is, data structure of program information or moving picture is not specified.

In the preferred embodiment, the method of selecting a still picture from moving picture is to selecting a still picture by using a representative identifier, as the representative still picture as still picture representing a moving picture holds in pair with representative identifier as information for identifying the representative still picture, but a still picture may be also selected by other method. For example, a first still picture composing a moving picture may be selected.

The software for realizing the information processing device in the preferred embodiment is a program described below. That is, this program is a program for causing a computer to execute a display program information acquiring step of acquiring one or more pieces of program information to be displayed, a time zone information acquiring step of acquiring each time zone information of one or more pieces of program information acquired at the display program information acquiring step, a display method determining step of determining the display method on the basis of each time zone information acquired at the time zone information acquiring step, a moving picture acquiring step of acquiring one or more moving pictures corresponding to one or more pieces of program information, and a program guide display step of displaying one or more moving pictures acquired at the moving picture acquiring step, and displaying an electronic program guide including the moving picture, on the basis of the display method determined at the display method determining step.

INDUSTRIAL APPLICABILITY

The invention can be utilized as information processing device or the like for displaying a menu of moving pictures. The invention can be also utilized as television, information processing device or the like for displaying an electronic program guide. The invention can be further utilized as information processing device or the like capable of displaying a moving picture on a map.

The invention claimed is:

1. A moving picture display device comprising:
   a moving picture storage unit for storing a plurality of moving pictures having respective position information as attribute values, the plurality of moving pictures corresponding to a plurality of regions and times, the position information including at least one of a latitude and a longitude;
   a present time acquiring unit for acquiring a present time for a predetermined region; and
   a moving picture display unit for displaying selected moving pictures of the plurality of moving pictures, the moving pictures selected corresponding to the present time and a time difference between the present time and a respective time for the plurality of regions,
   wherein the moving picture display unit displays the selected moving pictures relative to each other using the position information such that the displayed moving pictures are representative of the time of day at each of the respective plurality of regions, visually indicating locations of the selected moving pictures, when displaying the selected moving pictures of the plurality of moving pictures.

2. The moving picture display device of claim 1, further comprising:
   a map information storage unit for storing map information; and
   a map display unit for displaying the map information,
   wherein the moving picture display unit disposes and displays the selected moving pictures on the map information shown by the map display unit on the basis of the map information corresponding to the selected moving pictures.

3. The moving picture display device of claim 1, wherein the moving picture display unit displays the selected moving pictures, and also displays the position relation of the selected moving pictures visually, on the basis of respective position information as attribute values of the selected moving pictures being displayed.

4. The moving picture display device of claim 1, further comprising:
   a world clock holding unit for holding a world time,
   wherein the moving picture display unit calculates the time difference based on the world clock holding unit when displaying the selected moving pictures which correspond to the present time.

5. A computer readable medium including a program causing a computer to execute the steps of:
   storing a plurality of moving pictures having respective position information as attribute values, the plurality of moving pictures corresponding to a plurality of regions and times, the position information including at least one of a latitude and a longitude;
   acquiring a present time for a predetermined region; and
   displaying selected moving pictures of the plurality of moving pictures, the moving pictures selected corresponding to the present time and a time difference between the present time and a respective time for the plurality of regions,
   wherein the displaying step includes a step for displaying the selected moving pictures relative to each other using the position information such that the displayed moving pictures are representative of the time of day at each of the respective plurality of regions, visually indicating locations of the selected moving pictures, when displaying the selected moving pictures of the plurality of moving pictures.

* * * * *

UNITED STATES PATENT AND TRADEMARK OFFICE
CERTIFICATE OF CORRECTION

PATENT NO.       : 7,765,461 B2                                    Page 1 of 1
APPLICATION NO.  : 10/551656
DATED            : July 27, 2010
INVENTOR(S)      : Akihiko Suzuki et al.

It is certified that error appears in the above-identified patent and that said Letters Patent is hereby corrected as shown below:

Title Page

At Field [56], OTHER PUBLICATIONS, please Insert --Supplementary European Search Report for Application No. EP 04 72 5793 dated Nov. 27, 2008--.

Signed and Sealed this
Fifteenth Day of February, 2011

David J. Kappos
*Director of the United States Patent and Trademark Office*